United States Patent
Asada et al.

(10) Patent No.: US 7,883,270 B2
(45) Date of Patent: *Feb. 8, 2011

(54) HYDRODYNAMIC BEARING TYPE ROTARY DEVICE AND RECORDING AND REPRODUCING APPARATUS INCLUDING THE SAME

(75) Inventors: Takafumi Asada, Osaka (JP); Hiroyuki Kiriyama, Ehime (JP); Hiroaki Saito, Ehime (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 893 days.

This patent is subject to a terminal disclaimer.

(21) Appl. No.: 11/812,170

(22) Filed: Jun. 15, 2007

(65) Prior Publication Data

US 2008/0124013 A1    May 29, 2008

(30) Foreign Application Priority Data

Jun. 16, 2006    (JP)    .............................. 2006-167206

(51) Int. Cl.
*F16C 32/06*    (2006.01)

(52) U.S. Cl. ...................................... 384/107; 384/119

(58) Field of Classification Search ................. 384/100, 384/107, 119; 360/98.07, 99.08
See application file for complete search history.

(56) References Cited

U.S. PATENT DOCUMENTS

| | | | | |
|---|---|---|---|---|
| 5,372,432 | A * | 12/1994 | Ishikawa | .................... 384/133 |
| 6,717,310 | B2 * | 4/2004 | Yoshikawa et al. | ............. 310/90 |
| 7,204,642 | B2 * | 4/2007 | Kodama | ...................... 384/107 |
| 7,674,043 | B2 * | 3/2010 | Asada et al. | ................. 384/107 |
| 7,740,407 | B2 * | 6/2010 | Asada et al. | ................. 384/107 |
| 2005/0094906 | A1 * | 5/2005 | Satoh | .......................... 384/107 |
| 2006/0018573 | A1 | 1/2006 | Sodeoka et al. | |
| 2006/0034555 | A1 * | 2/2006 | Satoh | .......................... 384/107 |
| 2006/0051001 | A1 * | 3/2006 | Nishimura et al. | .......... 384/100 |
| 2006/0202577 | A1 * | 9/2006 | Maekawa et al. | ............. 310/90 |

FOREIGN PATENT DOCUMENTS

| | | |
|---|---|---|
| JP | 2004-183772 | 7/2004 |
| JP | 2004-183865 | 7/2004 |

\* cited by examiner

*Primary Examiner*—James Pilkington
(74) *Attorney, Agent, or Firm*—Wenderoth, Lind & Ponack, L.L.P.

(57) ABSTRACT

A hydrodynamic bearing type rotary device is configured to prevent air from being trapped inside a bearing and causing the bearing to have oil film rupture and NPPR to deteriorate. In the device, a flange having a shape substantially like a disc is provided integrally with a shaft near its lower portion. A sleeve having a bearing hole is fitted to the shaft so as to be relatively rotatable. Hydrodynamic grooves are provided on at least one of an outer periphery of the shaft and an inner periphery of the sleeve. The flange forms a thrust bearing surface with a lower end surface of the sleeve. Hydrodynamic grooves are provided on at least one of the lower surface of the sleeve and an upper surface of the flange. During rotation of the bearing, the hydrodynamic grooves circulate the lubricant. Capillary pressures at respective portions in the lubricant circulation path have different magnitudes. The principle that air tends to move toward the portion having a smaller capillary pressure is utilized to make it difficult for the air to be trapped inside the bearing and to smoothly discharge the air.

29 Claims, 15 Drawing Sheets

Jl: Resultant force of pumping pressures ru, rl, and s

HYDRODYNAMIC BEARING TYPE ROTARY DEVICE AND RECORDING AND REPRODUCING APPARATUS INCLUDING THE SAME

TECHNICAL FIELD

The present invention relates to a hydrodynamic bearing type rotary device used in a disc rotary device or the like and a recording and reproducing apparatus including the same.

BACKGROUND ART

In recent years, recording apparatuses and the like using rotating discs have had an increase in a memory capacity and an increase in a transfer rate for data. Thus, bearings used for such a recording apparatus is required to have high performance and high reliability to constantly rotate a disc load with control of a high accuracy. Accordingly, hydrodynamic bearings suitable for high-speed rotation are used for such rotary devices.

The hydrodynamic bearing type rotary device has a lubricant such as oil between a shaft and a sleeve, and generates a pumping pressure by hydrodynamic grooves during rotation. Thus, the shaft and the sleeve rotate in a non-contact state with respect to each other in the hydrodynamic bearing type rotary device so it is suitable for high-speed rotation.

Hereinafter, an example of conventional hydrodynamic bearing type rotary devices will be described with reference to FIG. 15. As shown in FIG. 15, a conventional hydrodynamic bearing type rotary device includes a shaft 21, a flange 22, oil 24, an upper cover 25, a hub 27, and a base 28.

The shaft 21 is integral with the flange 22. The shaft 21 is inserted into (fitted to) a bearing hole 23A of a sleeve 23 so as to be rotatable relative to the sleeve, with a gap G11 in a radial direction being interposed therebetween. The flange 22 opposes a lower surface 23C of the sleeve 23 and forms a bearing surface having a gap S11. The flange 22 also has a clearance portion (different dimension portion) 22B having a gap S12 on an inner peripheral side. On at least one of an outer peripheral surface of the shaft 21 and an inner peripheral surface of the sleeve 23, radial hydrodynamic grooves 23B are formed. On at least one of the sleeve lower surface 23C and an upper surface of the flange 22, thrust hydrodynamic grooves 22A are formed. The upper cover 25 is fixed to the sleeve 23 or the hub 27 having a gap S13 to the sleeve 23. Between an inner periphery of the upper cover 25 and an outer periphery of the shaft 21, a gap G13 in the radial direction is formed. Between an outer periphery of the flange 22 and an inner peripheral surface of the hub, a gap G12 in the radial direction is formed.

The clearance portion 22B having the gap S12 is not always necessary for performing a function as a bearing. However, as the motors have been miniaturized, the clearance portion is often provided in order to secure a predetermined floating level without increasing bearing loss. When the thrust hydrodynamic grooves 22A are in a spiral pattern, which is well known in the art as a pattern which generates pressures toward the inner periphery, a pressure becomes larger toward the inner periphery along the thrust hydrodynamic grooves 22A. The pressure does not decrease even when it comes near the clearance portion 22B and is maintained at a high level. Since the clearance causes the thrust gap to spread equivalently, the bearing loss can be reduced. In this way, a predetermined floating level can be secured without changing a rotational rate and/or weight of the motor.

The flange 22 and the gap S13 of the upper cover 25 communicate with one another by a communication hole 23E. At least the oil 24 is filled or held in the bearing gaps near the hydrodynamic grooves 23B and 22A and the communication hole 23E. To the hub 27, a disc 29 is fixed. To the base 28, the shaft 21 is fixed. A rotor magnet 30 is also fixed to the hub 27. A motor stator (not shown) is also fixed to the base 28 at a position opposing an outer periphery of the rotor magnet 30. If the base 28 is made of a magnetic material, the rotor magnet 30 generates an attraction force in an axial direction by leakage flux and presses the sleeve 23 toward the flange 22 with a force of about 10 to 50 grams. If the base 28 is not made of a magnetic material, an attraction plate made of a magnetic material having a ring shape is fixed to the base 28 at a position opposing an end surface of the rotor magnet 30).

Now, operations of the conventional hydrodynamic bearing type rotary device as described above will be described with reference to FIG. 15. In the above conventional hydrodynamic bearing type rotary device, when a rotational force is applied to the rotor magnet 30 by an electromagnetic function with the motor stator, the hub 27, the sleeve 23, the upper cover 25, and the disc 29 start to rotate. When these members rotate, the hydrodynamic grooves 23B and 22A gather the lubricant 24 such as oil to generate pumping pressures between the shaft 21 and the sleeve 23, and between the flange 22 and the sleeve 23. In this way, the rotating part including the sleeve 23 rotate in a non-contact state with respect to the shaft 21 and the flange 22. With a magnetic head or an optical head (not shown), data can be recorded/reproduced to/from the disc 29.

DISCLOSURE OF THE INVENTION

Problems to be Solved by the Invention

However, the above conventional hydrodynamic bearing type rotary device has the following problems. As shown in FIG. 15, when there is a clearance portion 22B having a wide gap S12, which is a different dimension portion, near the gap S11, air may be introduced into the bearing during assembling of the bearing, and/or air caught in from an oil interface during operation gather rather than being discharged. Air 32 accumulates in the gap S12 and is not discharged. When a bubble aggregated inside (air 32) expands under a low pressure environment, it may press out the oil 24 in the bearing gap.

The oil near the radial direction gap G13 of the upper opening portion readily catches the air 32 from the radial direction gap G13 of the opening portion. Moreover, the caught air 32 cannot be easily discharged. Eventually, the air flows into the bearing gap and causes oil film rupture which may result in rubbing of the bearing. Furthermore, when the air 32 enters into the bearing and forms a bubble, and the bubble aggregated inside (air 32) expands, it may press out the oil 24 in the bearing gap. Once the oil 24 flows out of the bearing in such a case, oil rupture may occur in the hydrodynamic grooves 22A and 23B. As a result, a predetermined performance cannot be achieved, or the rubbing in the bearing results in a failure of the bearing.

As a result of observation on the entering and discharging of the air 32, it is recognized that the air 32 tends to accumulate in the clearance portion 22B, which is a different dimension portion, when the gap S12 is too wide. However, regarding the discharging of the air from the bearing cavity, the cause cannot be explained simply by the widths of the gaps. Conventionally, it has been difficult to anticipate how easy the air 32 can be discharged or how easy the bubbles 32 are trapped in the bearing. Furthermore, in order to discharge the air 32 precisely, the pattern of the hydrodynamic grooves, directions of the generated pressures and the like have to be defined. However, such conditions for discharging the air have been unclear in terms of numerical values.

Moreover, when it is assumed that a diameter of the upper opening portion of the upper cover 25 is d11 and a diameter of the opening of the lower hub 27 or the sleeve 23 is d12, a centrifugal force is applied to the oil on the upper cover side during high-speed rotation if d12>>d11, and the oil flows out from the lower opening (gap G12). Thus, oil film rupture may occur at the hydrodynamic grooves 22A and 23B, and the bearing may seize in some cases.

Means for Solving the Problems

In order to solve the above-described problems, a hydrodynamic bearing type rotary device of the first invention, in which: a flange having a shape substantially like a disc is provided integrally with a shaft near its lower portion; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the flange forms a thrust bearing surface of a gap S1 with a lower end surface of the sleeve; hydrodynamic grooves are provided on at least one of the lower surface of the sleeve and an upper surface of the flange; a hub is integrally fixed to an outer periphery of the sleeve; a radial gap having a maximum gap G2 is provided between an outer peripheral surface of the flange and an inner surface of the sleeve or the hub which opposes thereto; a communication path which communicates with the flange is provided on the sleeve or the hub, and a circulation path from the gap G1 to the communication path is provided near an upper surface of the sleeve; a lubricant is held at least in the gaps S1 and G1, the circulation path, and the communication path; and when parameters at the gaps G1 and G2 are referred to as Pg1 and Pg2, they satisfy the relationship, Pg1>Pg2, is provided.

Herein, Pg1 and Pg2 are calculated as follows when the gap shape (a shape of a lubricant reservoir) is a shape substantially like a tube $$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m].

According to the present invention, a parameter representing a capillary pressure of the radial bearing gap G1 is larger than that of the flange outer peripheral portion gap G2. The gap S1 is formed when the sleeve with the hub rotates and floats or when the flange with the shaft rotates and floats.

In such a structure, the lubricant tends to move inward in the bearing, and thus, it does not easily leak out from the gap G2. The principle that air tends to move from a portion having a large capillary pressure toward a portion having a smaller capillary pressure is utilized to make it difficult for the air to be trapped inside the bearing and to smoothly discharge the air from the gap G2.

In a hydrodynamic bearing type rotary device of the second invention: a flange having a shape substantially like a disc is provided integrally with a shaft near its lower portion; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the flange forms a thrust bearing surface of a gap S1 with a lower end surface of the sleeve; hydrodynamic grooves are provided on at least one of the lower surface of the sleeve and an upper surface of the flange; a different dimension portion having a maximum gap S2 is provided between the flange and the lower end surface of the sleeve in a portion other than the thrust bearing surface and a hub is integrally fixed to an outer periphery of the sleeve; a radial gap having a maximum gap G2 is provided between an outer peripheral surface of the flange and an inner surface of the sleeve or the hub which opposes thereto; an upper cover is provided above the sleeve with a minimum gap S3 and a maximum gap S4 to an upper end surface of the sleeve, while the upper cover is fixed to the sleeve or the hub and an inner diameter portion of the upper cover has a gap at a position opposing a narrow diameter portion formed on an upper portion of the shaft; a communication path which communicates the flange with the upper cover is provided on the sleeve or the hub; a lubricant is held at least in the gaps S1, S2, G1 and S3, and the communication path; and, when parameters at the gaps G1, S2 and G2 are referred to as Pg1, Ps2 and Pg2, they satisfy the relationship, Pg1>Ps2>Pg2.

Herein, Pg1 and Pg2 are calculated as follows when the gap shape (a shape of a lubricant reservoir) is a shape substantially like a tube (expression set 1):

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and Ps2 is calculated as follows when the gap shape (a shape of the lubricant reservoir) is a shape substantially like a thin disc plate (expression set 2):

$$Fs = 2\pi \times Ds \times \gamma \times \cos\theta \quad (7)$$

$$As = \pi \times Ds \times S1 \quad (8)$$

$$Ps = Fs/As \quad (9)$$

Ds: Inner diameter of lubricant reservoir having maximum gap Si [m]
S: Maximum gap of lubricant reservoir between sleeve and hub [m].

According to the present invention, a parameter representing a capillary pressure of the different dimension portion having a maximum gap S2 is larger than that of the flange outer peripheral portion gap G2, and that of the radial bearing gap G1 is further larger. The gap S1 is formed when the sleeve with the hub rotates and floats or when the flange with the shaft rotates and floats.

In such a structure, the lubricant tends to move inward in the bearing, and thus, it does not easily leak out from the gap G2. The principle that air tends to move from a portion having a large capillary pressure toward a portion having a smaller capillary pressure is utilized to smoothly discharge the bubbles from the gap G2 without being trapped in the different dimension portion. having a maximum gap S2

In a hydrodynamic bearing type rotary device of the third invention, a flange having a shape substantially like a disc is provided integrally with a shaft near its lower portion; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the flange forms a thrust bearing surface of a gap S1 with a lower end surface of the sleeve; hydrodynamic grooves are provided on at least one of the lower surface of the sleeve and an upper surface of the flange; a hub is integrally fixed to an outer periphery of the sleeve; a gap is provided between an outer peripheral surface of the flange and an inner surface of the sleeve or the hub which opposes thereto; an upper cover is provided above the sleeve with a minimum gap S3 to an upper end surface of the sleeve, while a different dimension portion having a gap S4 larger than the gap S3 is provided near an inter periphery of the gap, the upper cover is fixed to the sleeve or the hub and an inner diameter portion of the upper cover is provided at a position opposing a narrow diameter portion formed on an upper portion of the shaft so as to have a maximum radial portion G3; a communication path which communicates the flange with the upper cover is provided on the sleeve or the hub; a lubricant is held at least in the gaps S1, G1 and S3, and the communication path; and, when parameters at the gaps G1, S3 and S4 are referred to as Pg1, Ps3 and Ps4, they satisfy the relationship, Pg1>Ps3>Ps4.

Herein, Pg1 is calculated as follows when the gap shape (a shape of a lubricant reservoir) is a shape substantially like a tube:

(Expression set 1)

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and Ps3 and Ps4 are calculated as follows when the gap shape (a shape of the lubricant reservoir) is a shape substantially like a thin disc plate:

(Expression set 2)

$$Fs = 2\pi \times Ds \times \gamma \times \cos\theta \quad (7)$$

$$As = \pi \times Ds \times S1 \quad (8)$$

$$Ps = Fs/As \quad (9)$$

Ds: Inner diameter of lubricant reservoir having maximum gap Si [m]
S: Maximum gap of lubricant reservoir between sleeve and hub [m].

According to the present invention, a parameter representing a capillary pressure of the gap S3 is larger than that of the different dimension portion of the gap S4, and that of the radial bearing gap G1 is further larger. The gap S1 is formed when the sleeve with the hub rotates and floats or when the flange with the shaft rotates and floats.

In such a structure, the lubricant tends to move inward from the gap S3, and thus, it does not easily leak out from the gap S4. The principle that air tends to move from a portion having a large capillary pressure toward a portion having a smaller capillary pressure is utilized to smoothly discharge the bubbles from the gap S4.

In a hydrodynamic bearing type rotary device of the fourth invention: a flange having a shape substantially like a disc is provided integrally with a shaft near its lower portion; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the flange forms a thrust bearing surface of a gap S1 with a lower end surface of the sleeve; hydrodynamic grooves are provided on at least one of the lower surface of the sleeve and an upper surface of the flange; a hub is integrally fixed to an outer periphery of the sleeve; a gap is provided between an outer peripheral surface of the flange and an inner surface of the sleeve or the hub which opposes thereto; an upper cover is provided above the sleeve with a minimum gap S3 to an upper end surface of the sleeve, while the upper cover is fixed to the sleeve or the hub and an inner diameter portion of the upper cover is provided at a position opposing a narrow diameter portion formed on an upper portion of the shaft so as to have a maximum radial portion G3; a communication path which communicates the flange with the upper cover is provided on the sleeve or the hub; a lubricant is held at least in the gaps S1, S3, G1 and G3, and the communication path; and, when parameters at the gaps G1, S3, and G3 are referred to as Pg1, Ps3 and Pg3, they satisfy the relationship, Pg1>Ps3>Pg3.

Herein, Pg1 and Pg3 are calculated as follows when the gap shape (a shape of a lubricant reservoir) is a shape substantially like a tube:

(Expression set 1)

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and Ps3 is calculated as follows when the gap shape (a shape of the lubricant reservoir) is a shape substantially like a thin disc plate:

(Expression set 2)

$$Fs = 2\pi \times Ds \times \gamma \times \cos\theta \quad (7)$$

$$As = \pi \times Ds \times S1 \quad (8)$$

$$Ps = Fs/As \quad (9)$$

Ds: Inner diameter of lubricant reservoir having maximum gap Si [m]
S: Maximum gap of lubricant reservoir between sleeve and hub [m].

According to the present invention, a parameter representing a capillary pressure of the gap S3 is larger than that of the different dimension portion of the gap G3, and that of the radial bearing gap G1 is further larger. The gap S1 is formed when the sleeve with the hub rotates and floats or when the flange with the shaft rotates and floats.

In such a structure, the lubricant tends to move inward from the gap S3, and thus, it does not easily leak out from the gap G3. The principle that air tends to move from a portion having a large capillary pressure toward a portion having a smaller capillary pressure is utilized to smoothly discharge the bubbles from the gap G3.

In a hydrodynamic bearing type rotary device of the fifth invention: a flange having a shape substantially like a disc is provided integrally with a shaft near its lower portion; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the flange forms a thrust bearing surface of a gap S1 with a lower end surface of the sleeve; hydrodynamic grooves are provided on at least one of the lower surface of the sleeve and an upper surface of the flange; a hub is integrally fixed to an outer periphery of the sleeve; a radial gap having a maximum gap G2 is provided between an outer peripheral surface of the flange and an inner surface of the sleeve or the hub which opposes thereto; an upper cover is provided above the sleeve with a minimum gap S3 to an upper end surface of the sleeve, while the upper cover is fixed to the sleeve or the hub and an inner diameter portion of the upper cover is provided at a position opposing a narrow diameter portion formed on an upper portion of the shaft so as to have a maximum radial portion G3; a communication path which communicates with the flange is provided on the sleeve or the hub, and a circulation path from the gap G1 to the communication path is provided near an upper surface of the sleeve; a lubricant is held at least in the gaps S1 and G1, and the communication path; and, when parameters at the gaps G1, G2, and G3 and the communication path are referred to as Pg1, Pg2, Pg3, and Pp, they satisfy the relationship, Pg1>Pp, Pp>Pg2, and Pp>Pg3.

[Expression set 1] Pg1 and Pg2 are calculated as follows when the gap shape (a shape of a lubricant reservoir) is a shape substantially like a tube:

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and

[Expression set 3] Pp is calculated as follows when the gap shape (a shape of a lubricant reservoir) is a shape substantially like a tube:

$$Fg = 2 \times (u+t) \times \gamma g \times \cos\theta g \quad (10)$$

$$Ag = u \times t \quad (11)$$

$$Pg = Fg/Ag \quad (12)$$

$$Pp = 2 \times \gamma g \times \cos\theta g \times (u+t)/(u \times t) \quad (13)$$

u: Length of a side of cross section [m]
t: Length of another side of cross section [m]
γg: Surface tension of oil [N/m]
θ: Contact angle of oil [rad].

According to the present invention, a parameter representing a capillary pressure of the gap G1 is larger than that of the communication path, and that of the communication path is larger than those of the gasp G2 and G3.

In such a structure, the lubricant tends to move toward the gap G1, and thus, it does not easily leak out from the gaps G2 and G3. The principle that air tends to move from a portion having a large capillary pressure toward a portion having a smaller capillary pressure is utilized to smoothly discharge the bubbles from the gaps G2 and G3.

In a hydrodynamic bearing type rotary device of the sixth invention: a hub having a shape substantially like a disc is provided integrally with one end portion of a shaft; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the hub forms a thrust bearing surface of a gap S1 with one end surface of the sleeve; hydrodynamic grooves are provided on at least one of the end surface of the sleeve and an opposing surface of the hub; a radial gap having a maximum gap G2 is provided between an outer peripheral surface of the flange and an inner surface of the hub which opposes thereto; a communication path which communicates with the hub is provided on the sleeve, and a circulation path from the gap G1 to the communication path is provided near an upper surface of the sleeve; a lubricant is held at least in the gaps S1 and G1, the circulation path, and the communication path; and, when parameters at the gaps G1 and G2 are referred to as Pg1 and Pg2, they satisfy the relationship, Pg1>Pg2.

Herein, Pg1 and Pg2 are calculated as follows when the gap shape (a shape of a lubricant reservoir) is a shape substantially like a tube:

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m].

By having a parameter representing a capillary pressure of the radial bearing gap G1 larger than that of the flange outer peripheral portion gap G2, the lubricant tends to move inward in the bearing. Thus, it does not easily leak out from the gap G2. The principle that air tends to move from a portion having a large capillary pressure toward a portion having a smaller capillary pressure is utilized to make it difficult for the bubbles to be trapped inside the bearing and to smoothly discharge the bubbles from the gap G2. The gap S1 is formed when the sleeve with the hub rotates and floats or when the flange with the shaft rotates and floats.

In a hydrodynamic bearing type rotary device of the seventh invention: a hub having a shape substantially like a disc is provided integrally with one end portion of a shaft; a sleeve having a bearing hole is fitted to the shaft so as to be relatively rotatable with a radial gap G1 being interposed therebetween and hydrodynamic grooves are provided on at least one of an outer periphery of the shaft and an inner periphery of the sleeve; the hub forms a thrust bearing surface of a gap S1 with one end surface of the sleeve; hydrodynamic grooves are provided on at least one of the end surface of the sleeve and an opposing surface of the hub; a different dimension portion having a maximum gap S2 is provided between the hub and the end surface of the sleeve in a portion other than the thrust bearing surface; a radial gap having a maximum gap G2 is provided between an outer peripheral surface of the flange and an inner surface of the hub which opposes thereto; a communication path which communicates with the hub is provided on the sleeve; a lubricant is held at least in the gaps S1, G1, S2 and G2, and the communication path; and, when parameters at the gaps G1, S2 and G2 are referred to as Pg1, Ps2, and Pg2, they satisfy the relationship, Pg1>Ps2>Pg2.

Herein, Pg1 and Pg2 are calculated as follows when the gap shape (a shape of a lubricant reservoir) is a shape substantially like a tube:

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m], and Ps2 is calculated as follows when the gap shape (a shape of the lubricant reservoir) is a shape substantially like a thin disc plate:

$$Fs = 2\pi \times Ds \times \gamma \times \cos\theta \quad (7)$$

$$As = \pi \times Ds \times S1 \quad (8)$$

$$Ps = Fs/As \quad (9)$$

Ds: Inner diameter of lubricant reservoir having maximum gap Si [m]
S: Maximum gap of lubricant reservoir between sleeve and hub [m].

By having a parameter representing a capillary pressure of the different dimension portion S2 larger than that of the flange outer peripheral portion gap G2, and that of the radial bearing gap G1 further larger, the lubricant tends to move inward in the bearing. Thus, it does not easily leak out from the gap G2. The principle that air tends to move from a portion having a large capillary pressure toward a portion having a smaller capillary pressure is utilized to smoothly discharge the bubbles from the gap G2 without being trapped in the different dimension portion S2.

Effects of the Invention

As described above, according to the present invention, parameters representing capillary pressures at the radial bearing gap, the thrust bearing portion, and other portions are set to have different values intentionally. The principle that the lubricant tends to move toward a portion having a large capillary pressure and air tends to move toward a portion having a small capillary pressure is utilized to smoothly discharge the air from a gas liquid interface of the lubricant reservoir without being trapped inside the bearing. In this way, oil film rupture at the hydrodynamic grooves can be prevented and a hydrodynamic bearing type rotary device can be realized. Further, the pressure generated at the hydrodynamic grooves is utilized to direct the lubricant forcibly into the gaps in the bearing to smoothly discharge the air outside the bearing.

DETAILED DESCRIPTION OF THE INVENTION

First Embodiment

Hereinafter, an embodiment which specifically shows the best mode for carrying out the invention will be described with reference to the drawings. The present invention employs parameters which indicate a capillary phenomenon in bearings. Such parameters correspond to capillary pressures. In the following description, they are described as capillary pressures.

First Example

Figure 1:
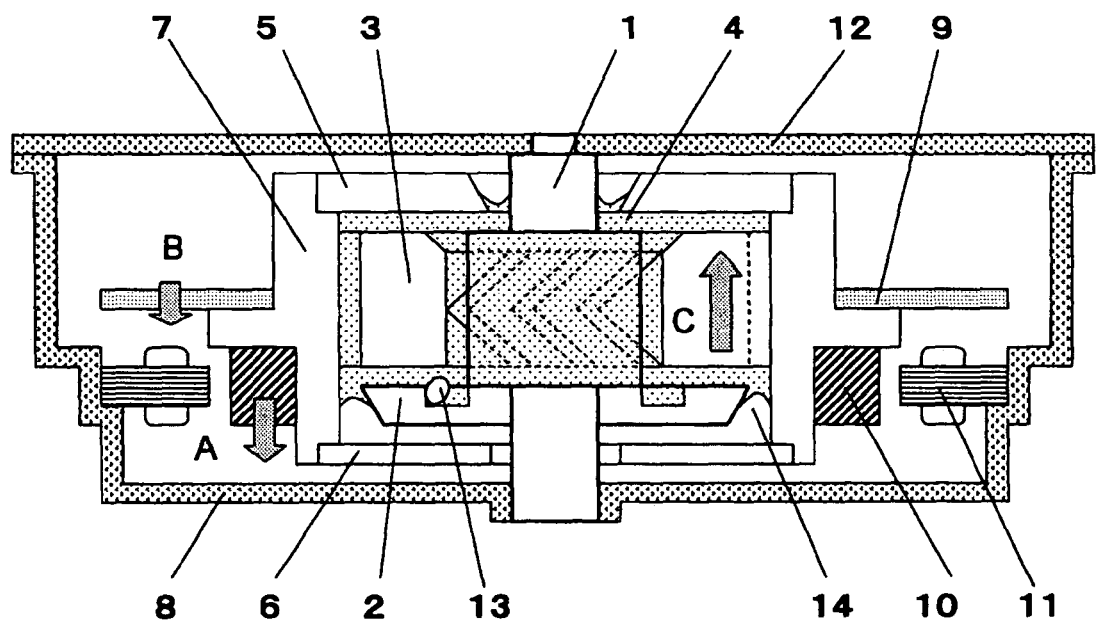
FIG. 1 is a cross-sectional view of a hydrodynamic bearing rotary type device according to a first example of the present invention.

An exemplary hydrodynamic bearing type rotary device of the first example will be described with reference to FIGS. 1 through 9. As shown in FIG. 1, the hydrodynamic bearing type rotary device according to the present invention includes a shaft 1, a flange 2, a sleeve 3, a lubricant 4 such as oil, high-fluidity grease, ionic liquids or the like, an upper cover 5, a hub 7, and a base 8. To the hub 7, a disc 9 and a rotor magnet 10 are attached. To the base 8, a stator 11 and a lid 12 are attached. A magnetic head or an optical head (not shown) accesses to the disc 9 to record/read out a signal.

Figure 2:
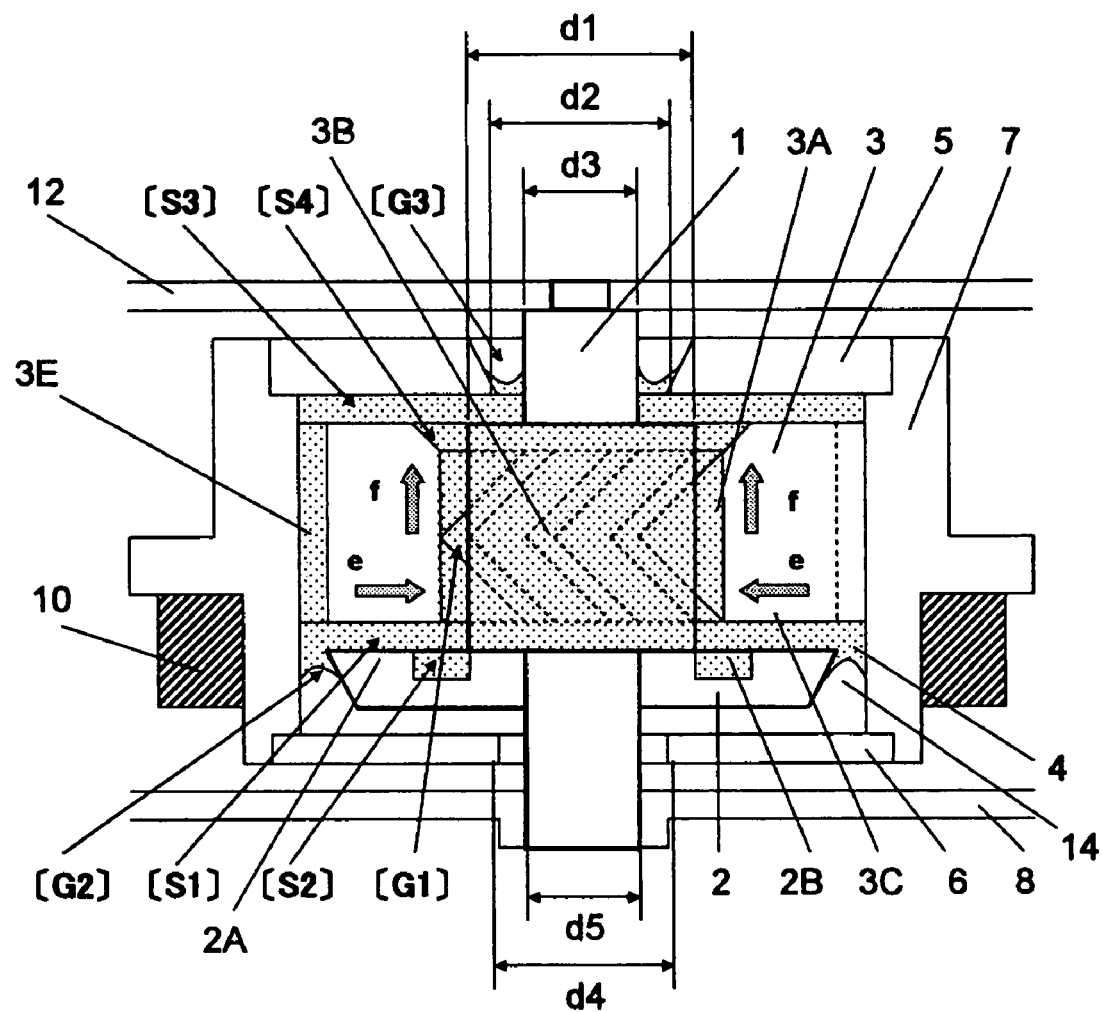
FIG. 2 is a detailed cross sectional diagram of the hydrodynamic bearing type rotary device of the present invention.

FIG. 2 is an enlarged view of the bearing portion shown in FIG. 1. The shaft 1 is integral with the flange 2. They may be integrally machined, press fitted and adhered, or welded. The shaft 1 is inserted into a bearing hole 3A of the sleeve 3 so as to be relatively rotatable with a radial gap G1 being interposed therebetween. The flange 2 opposes a lower surface 3C of the sleeve 3 and forms a bearing surface having a gap S1. On an inner peripheral side, a clearance portion 2B, which is a different dimension portion, having a gap S2 is formed on the flange 2 or the sleeve 3. The clearance portion 2B is not always necessary in the bearing structure. In FIGS. 1 and 2, the clearance portion 2B is formed on the flange 2. However, a similar function can be achieved by forming a different dimension portion, which is like a chamfered portion S4 shown in FIGS. 1 and 2, on a lower portion of the bearing hole 3A of the sleeve 3.

On at least one of an outer peripheral surface of the shaft 1 and an inner peripheral surface of the sleeve 3, radial hydrodynamic grooves 3B are formed. On at least one of the sleeve lower surface 3C and an upper surface of the flange 2, thrust hydrodynamic grooves 2A are formed. The upper cover 5 has the minimum gap S3 with respect to the sleeve 3. The upper cover 5 is fixed to the sleeve 3 or the hub 7. In FIGS. 1 and 2, a step portion is provided on an upper end of the hub 7 so that the upper cover 5 can fit thereto. However, an outer sleeve may be provided outside the sleeve 3. A two component structure including the inner sleeve and the outer sleeve may be fixed to the hub. In such an example, the upper cover is fixed to the sleeve. Alternatively, a step portion may be provided on a lower surface of an outer periphery of the upper cover 5 to secure the gap S3. In such an example, the upper cover is also fixed to the sleeve.

Adjacent to the gap S3, a portion having a gap S4 wider than the gap S3 is provided between the upper cover 5 and the sleeve 3. An outer peripheral surface of the flange 2 opposes the hub 7 or the inner peripheral surface of the sleeve 3 to form a maximum gap G2. The flange 2 opposes to a lower cover 6 on a side opposite to a surface which opposes the sleeve 3 with a gap being interposed therebetween to address the necessity of improving oil sealing function. The lower cover 6 is fixed to the hub 7 or the sleeve 3, and the upper cover 5, the sleeve 3, the hub 7, and the lower cover 6 rotate integrally. Between an inner peripheral surface of the upper cover 5 and an outer peripheral surface of a first narrow diameter portion of the shaft 1, a maximum radial gap G3 is formed.

The gap S1 between the flange 2 and the sleeve 3 communicates with the gap S3 between the upper cover 5 and the sleeve 3 by a communication hole or path 3E. The gap S1 is formed when the sleeve 3 with the hub 7 rotates and floats. At least the lubricant 4 such as oil, high-fluidity grease, ionic liquids or the like is filled or held in bearing gaps near the hydrodynamic grooves 3B and 2A, the communication hole 3E and the gap S3. To the base 8, the shaft 1 is fixed. To the hub 7, the disc 9 and the rotor magnet 10 are attached. A stator (shown in FIG. 1) is also fixed to the base 8 at a position opposing an outer peripheral surface of the rotor magnet 10. Since the base 8 is made of a magnetic material, the rotor magnet 10 generates an attraction force in an axial direction as indicated by arrow A (FIG. 1) and presses the sleeve 3 toward the flange 2 with a force of about 10 to 50 grams. If the base 8 is made of a non-magnetic material, an attraction plate made of a magnetic material having a shape like a doughnut is fixed to, for example, a position opposing a lower end surface of the rotor magnet 10 to generate an attraction force).

As shown in FIG. 2, reference numerals S1, S2, and S2 refer to gaps between two planar surfaces; reference numerals G1, G2, and G3 refer to radial gaps between two tubes.

Operations of the hydrodynamic bearing type rotary device of the present invention which has the above-described structure are as follow. In the hydrodynamic bearing type rotary device of the present invention shown in FIGS. 1 and 2, when an electric current is supplied to a coil wound around the stator 11, a rotary magnetic field is generated and a rotary force is applied to the rotor magnet 10. This causes the hub 7, the sleeve 3, the upper cover 5, the disc 9, and the lower cover 6 to rotate.

As these members rotate, the hydrodynamic grooves 3B and 2A gather the lubricant 4 such as oil filled in the bearing gaps. Accordingly, pumping pressures are generated between the shaft 1 and the sleeve 3, and between the flange 2 and the sleeve 3.

As shown in FIGS. 1 and 2, the rotor magnet 10 and the stator 11 generate a force attracting the rotor magnet 10 in the direction indicated by arrow A (FIG. 1). Further, the empty weight of the rotating part is applied in the direction indicated by arrow B (FIG. 1). On the other hand, the hydrodynamic pressure by the thrust hydrodynamic grooves 2A is applied in the direction indicated by arrow C (FIG. 1). In such an example, a floating force of the thrust hydrodynamic grooves 2A is automatically adjusted such that the relationship:

$$A+B=C$$

is satisfied. Thus, floating level (oil film thickness) is automatically defined.

As shown in FIG. 2, the hydrodynamic grooves 3B form a herringbone pattern, for example. The thrust hydrodynamic grooves 2A are designed to have a spiral pattern or asymmetrical herringbone pattern which carries the lubricant 4 from the outer peripheral side where an oil reservoir 14 of the radial gap G2 locates toward the inner peripheral side as indicated by arrow e (FIG. 2). With such a structure, the lubricant 4 passes through the gap S1, which is a thrust bearing gap, and the clearance portion S2, which is a different dimension portion, and moves through the bearing hole 1A, which is formed of the gap G1, from the lower side to the upper side in the figure in a direction indicated by arrow f (FIG. 2). Then, the lubricant 4 passes through the gaps S4 and S3, and flows back to the oil reservoir 14 of the maximum radial gap G2, which is provided on the outer peripheral surface of the flange 2, via the communication hole 3E. In this way, the lubricant 4 is always supplied to the bearing gap of the hydrodynamic grooves 3B and 2A from the oil reservoir 14 on the outer periphery of the flange 2.

Figure 3:
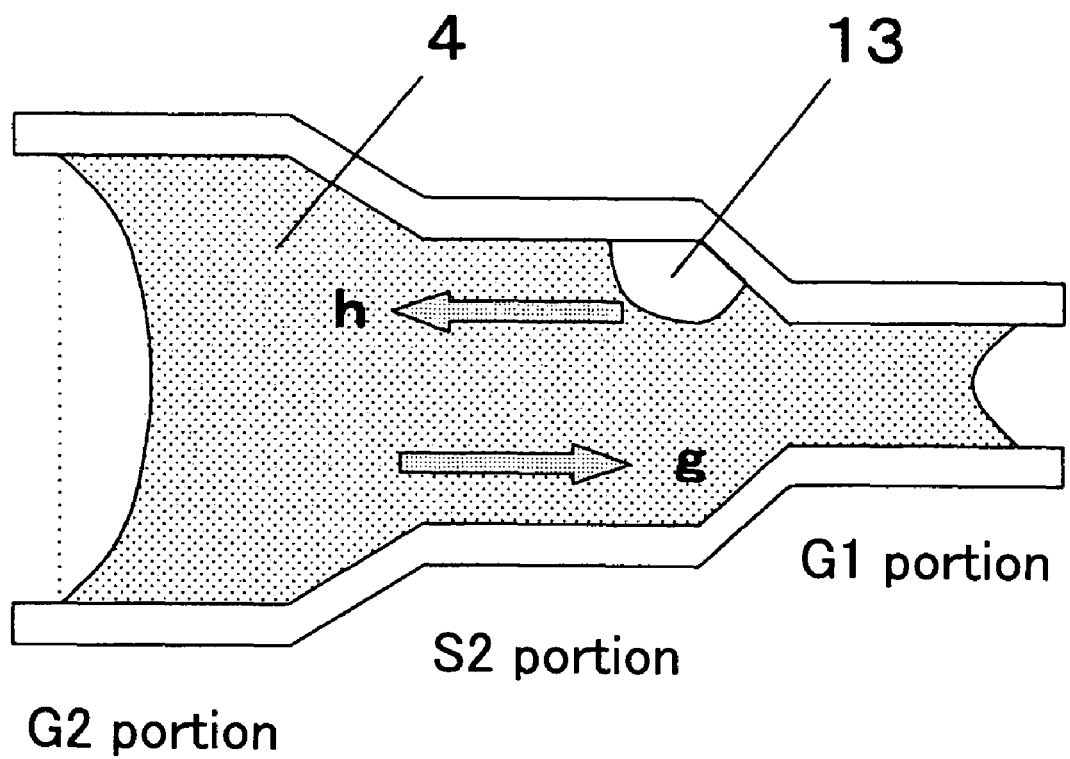
FIG. 3 is an image diagram of a tubular path of the hydrodynamic bearing type rotary device of the present invention.
Figure 5:
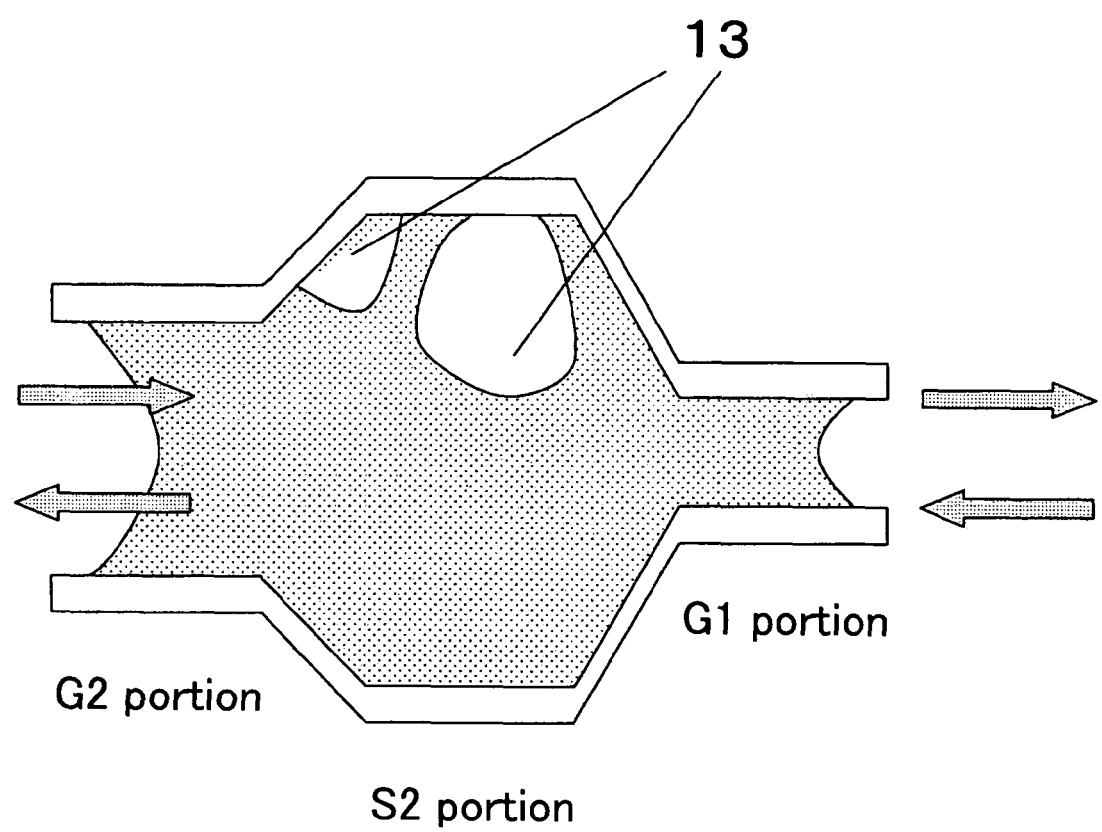
FIG. 5 is an image diagram of a tubular path of the hydrodynamic bearing type rotary device.
Figure 15:
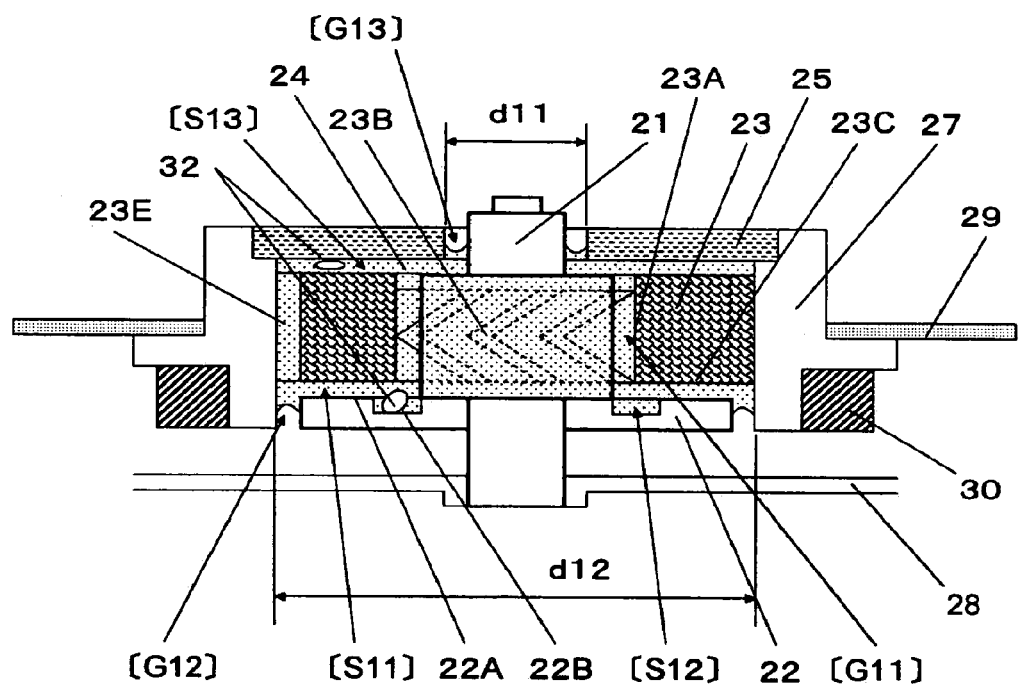
FIG. 15 is a cross sectional view of a conventional hydrodynamic bearing type rotary device.

As shown in FIG. 2, the lubricant 4 is held in the gaps G2, S1, S2, and G1. The radial gap inside the bearing hole 1A of the shaft 1 is referred to as G1, and a parameter corresponding to the capillary pressure applied to the gap is referred to as $Pg1$. The maximum gap of the clearance portion, which is a different dimension portion, provided between the flange 2 and the sleeve 3 near a corner on an interface with the shaft 1 is referred to as S2. A parameter corresponding to a capillary pressure applied to the S2 portion is referred to as $Ps2$. Further, the maximum radial portion of the flange outer peripheral surface (oil reservoir 14) is referred to as G2. A parameter corresponding to a capillary pressure applied to the gap G2 portion is referred to as $Pg2$. Parameters corresponding to the capillary pressures are calculated based on the dimensions of respective portions of the bearing having the above-described structure. FIGS. 3 and 5 show tubular paths having values equivalent to the calculated parameters corresponding to the capillary forces. First, it is assumed that air or bubble 13 enters into the bearing cavity as shown in an image diagram of the tubular path according to the present example shown in FIG. 3. Conventionally, there has been a risk that oil rupture occurs in the bearing gap when the volume of the air changes or the pressure in the bearing cavity decreases and the volume of the air expands. However, if the structure has the parameters corresponding to the capillary pressures equivalent to the tubular path has a shape as shown in FIG. 3 and, the lubricant 4 tends to move in a direction indicated by arrow g in the figure toward the radial gap G1 where the capillary pressure is larger. As a result, the bubble 13 moves in the opposite direction (a direction indicated by arrow h in the figure), and the air 13 is discharged from the opening (the gap G2) without being accumulated. Such a phenomenon is found through a number of times of observational experiment. However, it is elucidated that, if the tubular path has a shape as shown in FIG. 5, which an image diagram showing a conventional tubular path of FIG. 15, the air 13 accumulate in the middle of the tubular path, or cannot be easily discharged since the capillary pressure at the gap S2 in the middle of the tubular path is small through the observational experiment. The discharging of the air cannot be anticipated by only considering the relationship of the widths among the gaps as in the conventional art. The air can be discharged only when the relationship of the magnitudes among the capillary forces is kept appropriately. This is confirmed through the observational experiment.

Figure 4:
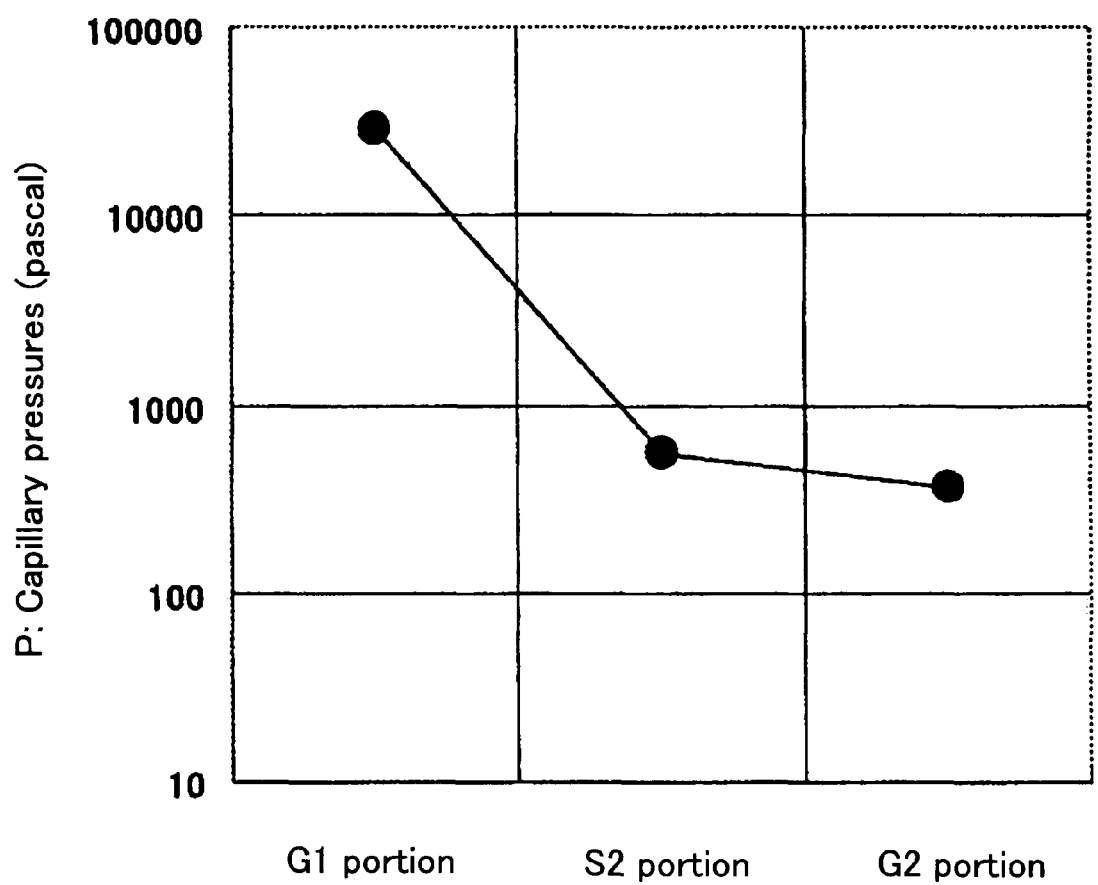
FIG. 4 is a capillary pressure chart.

In the example of the present invention shown in FIG. 2, when the clearance portion 2B, which is a different dimension portion, provided between the flange 2 and the sleeve 3 near a corner on an interface with the shaft 1 is not provided, as shown in FIG. 4, the capillary pressures of the portions G1, S1, and G2 satisfy the relationship:

$Pg1 > Ps1 > Pg2$.

Figure 7:
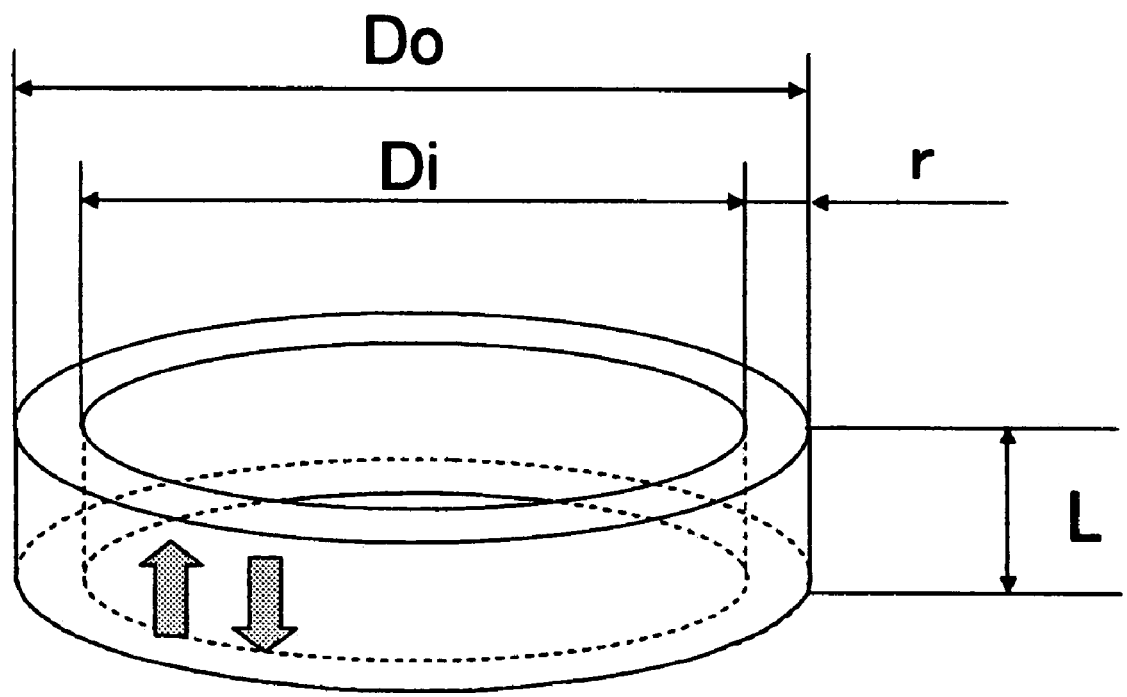
FIG. 7 is a diagram defining capillary pressures.

By designing the bearing to satisfy the condition, a safe bearing in which the bubble 13 is not easily trapped in or enter into the bearing cavity can be obtained. FIG. 7 shows a shape of the gaps G1 and G2 (referred to as a lubricant reservoir in the explanation of expressions) shown in FIG. 2. The capillary pressures in such an example ($Pg1$ and $Pg2$) are defined by the following expression set 1.

Alternatively, when the clearance portion 2B, which is a different dimension portion, provided between the flange 2 and the sleeve 3 near a corner on the interface with the shaft 1 is provided, and the gap of the portion is referred to as S2, the following relationship is satisfied:

$Pg1 > Ps2 > Pg2$.

$Pg1$ and $Pg2$ are calculated as follows when the gap shape (a shape of the lubricant reservoir) is a shape substantially like a tube.

(Expression Set 1)

$$Fgo = \pi \times Do \times \gamma \times \cos\theta \qquad (1)$$

$$Fgi = \pi \times Di \times \gamma \times \cos\theta \qquad (2)$$

$$Di = Do - 2 \times rg \qquad (3)$$

$$Fg = Fgo + Fgi \qquad (4)$$

$$Ag = \pi \times (Do^2 - Di^2)/4 \qquad (5)$$

$$Pg = Fg/Ag \qquad (6)$$

γ: Surface tension of lubricant [N/m]
θ: Contact angle of oil [radian]
Do: Outer diameter of tube [m]
Di: Inner diameter of tube [m]
rg: Oil film thickness of tube [m]
Pg: Capillary pressure [pascal]

Specifically, when γ=0.0288 [N/m], θ=0.2269 [radian], Do=0.00199 [m], and rg=0.000002 [m], $Pg1$ is a pressure of about 28000 [pascal]. When Do=0.005 [m] and rg=0.00015 [m], $Pg2$ is a pressure of about 370 [pascal].

For measuring physical property values of the lubricant 4, a measurement method called a ring method may be used to measure a surface tension (γ) of the lubricant 4 if a certain amount of sample can be obtained. According to this method, a contact angle (θ) can be measured by dropping a small amount, for example, 0.5 microliters of the lubricant on an iron plate which is polished and then cleaned. The contact angle is measured by a camera or a microscope.

Figure 8:
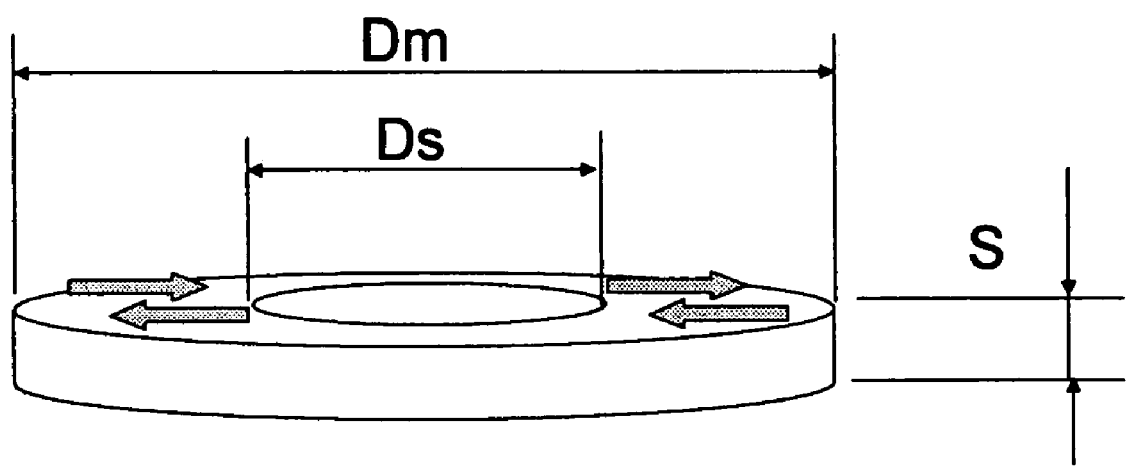
FIG. 8 is a diagram defining capillary pressures.

FIG. 8 shows a shape of a portion of the maximum gap S2 under the lower surface of the sleeve 3 of FIG. 2 (referred to as a lubricant reservoir in the explanation of expressions). Capillary pressure ($Ps2$) in such an example is defined by following expression set 2.

$Ps2$ is calculated as follows when the gap shape (a shape of the lubricant reservoir) is a shape substantially like a thin disc plate.

(Expression Set 2)

$$Fs = 2\pi \times Ds \times \gamma \times \cos\theta \qquad (7)$$

$$As = \pi \times Ds \times S1 \qquad (8)$$

$$Ps = Fs/As \qquad (9)$$

Ds: Inner diameter of lubricant reservoir having maximum gap S2 [m]

S2: Maximum gap of lubricant reservoir between sleeve and hub [m]

Ps2: Capillary pressure [pascal]

Specifically, when Ds=0.002 [m] and S2=0.0001 [m], the pressure value of Ps2 is about 560 [pascal].

As shown in FIG. 2, the lubricant such as oil is held at least in the gaps S1, G1, and S3 and the communication path. The gap G2 may or may not have the lubricant depending upon a position of the gas liquid interface at the oil reservoir 14. The capillary pressures at the gaps G1 and G2 (Pg1 and Pg2) are set to satisfy the relationship:

Pg1>Pg2.

Figure 6:
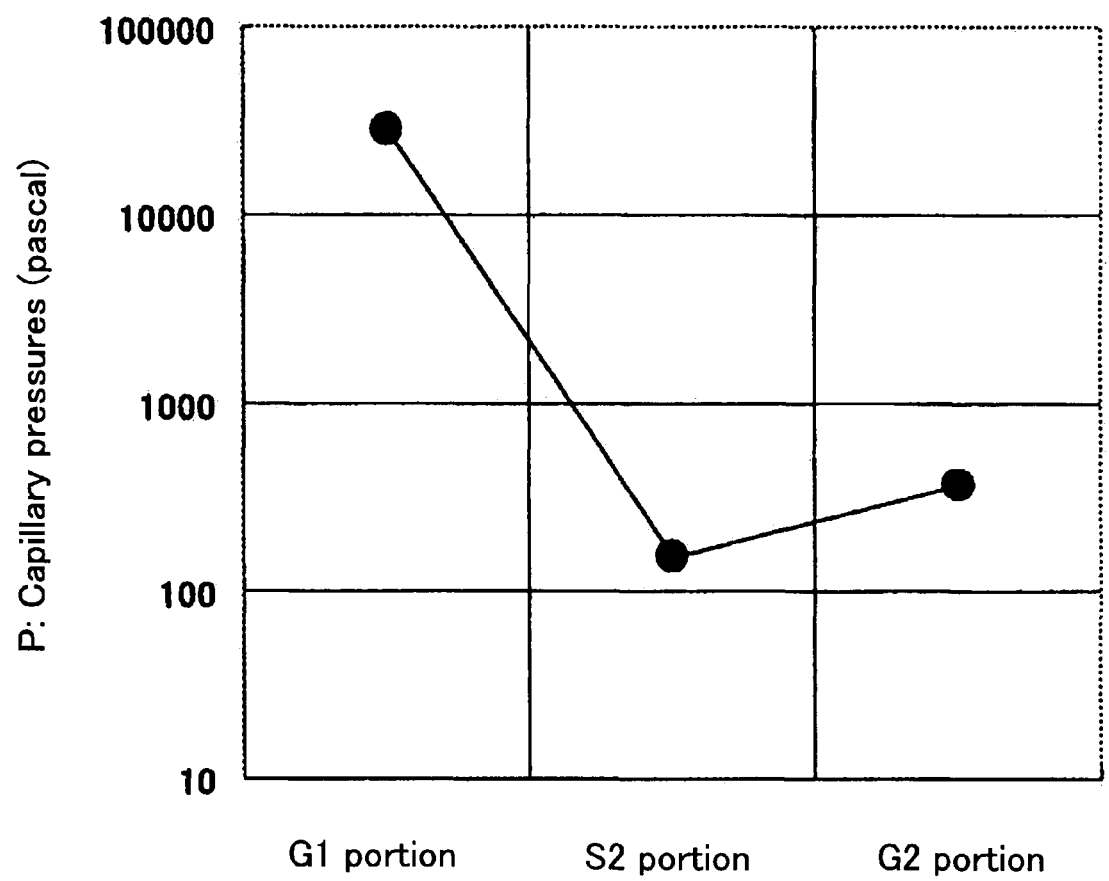
FIG. 6 is a capillary pressure chart.

With such a structure, the lubricant 4 in the oil reservoir 14 flows into the bearing cavity forcibly by a pumping pressure and the capillary pressure toward the bearing cavity in the thrust hydrodynamic grooves 2A. As a result, the air receives the force to be pressed out toward the outside of the bearing, so it becomes difficult for the air to intrude into the bearing cavity. FIG. 4 shows an example in which the magnitudes of the capillary pressures at the gaps G1, S1 and G2 have a good relationship. With such capillary pressures, the air is readily discharged and cannot be easily trapped inside. FIG. 6 shows capillary pressures of gaps in another design model which is not shown. In such an example, the air is to be moved from the gap G1 to the gap G2. However, in some cases, the air temporarily stays in the gap S2 portion. In the hydrodynamic bearing type rotary device having the pressure chart of FIG. 6, air is discharged more smoothly compared to that having the pressure chart of FIG. 4. Although the pressure chart is not shown herein, if the capillary pressures are designed to be Pg1<Pg2 as in the conventional example (FIG. 15), the air tends to stay inside and cannot be easily discharged.

Figure 10:
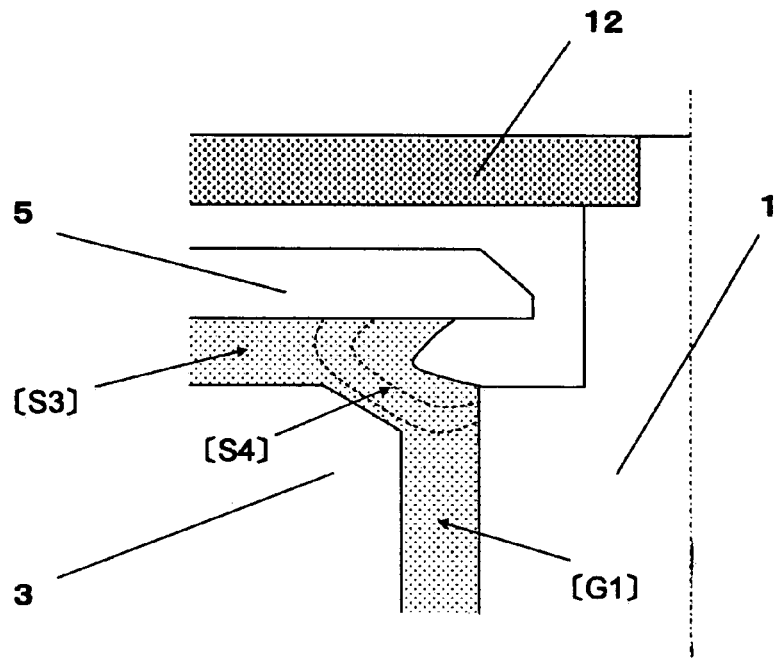
FIG. 10 is a diagram showing a gas liquid interface near a gap S4 according to the present invention.

FIG. 10 shows an example in which the gas liquid interface is near a lower portion of the upper cover 5. As shown in FIGS. 2 and 10, the lubricant such as oil is held at least in the gaps S1, G1, and S3 and the communication path. The gap S4 may have the lubricant or substantially no lubricant depending upon a position of the gas liquid interface as shown in FIG. 10. The capillary pressures at the gaps G1, S3 and S4 (Pg1, Ps3 and Ps4) are set to satisfy the relationship:

Pg1>Ps3>Ps4.

With such a structure, the air can no longer enter easily in the radial bearing gap formed of the radial bearing gap G1 in a circulation path formed of the gaps S3 and S4 near the upper portion of the sleeve 3.

Figure 11:
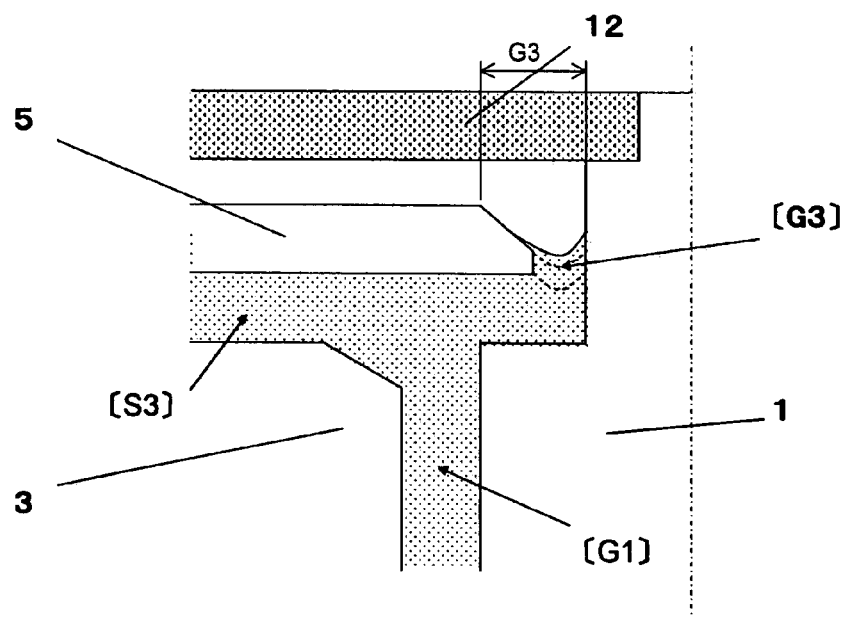
FIG. 11 is a diagram showing a gas liquid interface near a gap G3 according to the present invention.

FIG. 11 shows an example in which the gas liquid interface is near an inner peripheral surface of the upper cover 5. As shown in FIGS. 2 and 11, the capillary pressures at the gaps G1, S3 and G3 (Pg1, Ps3 and Pg3) are set to satisfy the relationship:

Pg1>Ps3>Pg3.

With such a structure, the air can no longer enter easily in the radial bearing gap formed of the radial bearing gap G1 in a circulation path formed of the gap S3 near the upper portion of the sleeve 3. Since the capillary pressure at the opening portion of the upper portion formed of the gap G3 is sufficiently low, the oil cannot easily flow into to this portion. Depending upon the position of the gas liquid interface, the air covers the portion. Thus, even if the air or bubble 13 is in the circulation path of the gaps G1 and S3, it can be readily discharged from the gap G3.

FIG. 11 shows an example including the gap S4. However, since the gas liquid interface is near the inner peripheral surface of the upper cover 5, the effects as described above can be achieved even when there is no gap S4.

As shown in FIG. 2, the gaps S1, G1, and S3 and the communication path 3E forms a circulation path for the lubricant 4. On the other hand, the gaps G2, S4, and G3 form an oil reservoir for supplying the lubricant 4 to the circulation path. The gaps G2, S4, and G3 are open to the atmosphere. They have a function to discharge air or bubble when there is a bubble or a large amount of air in the circulation path.

In order to make a flow toward the circulation path more smoothly with the surface tension of the oil for discharging, it is desirable that the gaps G2, S4, and G3 have a tapered shape spreading toward the atmosphere.

As described above, since no bubble enter the hydrodynamic bearing surface and operation can be performed without oil film rupture, the shaft 1 can be rotated stably in a non-contact state with respect to the sleeve 3 and the thrust plate 2. As a result, with a magnetic head or an optical head (not shown), data can be recorded/reproduced stably to/from a rotating disc 10. Further, a hydrodynamic bearing type rotary device which can prevent oil film rupture and deterioration of NRRO and which has high performance and reliability can be obtained.

As shown in FIG. 2, in the maximum gap G3 portion between the inner peripheral surface of the upper cover 5 and the outer peripheral surface of the narrow diameter portion of the shaft 1 near the upper end, an outer diameter d1 of the radial bearing surface of the shaft, an inner diameter d2 of the upper cover, and a diameter d3 of the narrow diameter portion of the shaft 1 have the relationship, d1>d2>d3. By maintaining the relationship of the bearing dimension, a centrifugal force is applied to the lubricant 4 during rotation of the bearing. Thus, leakage of the lubricant 4 from the gap G3 opened to the atmosphere can be prevented completely. Since the oil is carried forcibly by the centrifugal force toward the gap G2, if there is a bubble near the opening, the bubble 13 lighter than the lubricant 4 is affected by gravity difference and is released to the atmosphere from the gap G3. In this way, the lubricant 4 can be prevented from flowing out.

As shown in FIG. 2, the shaft 1 has a second narrow diameter portion on the lower end. A diameter d5 of the second narrow diameter portion, an inner diameter d4 of the lower cover 6, and the outer diameter d1 of the radial bearing surface of the shaft 1 are designed to have the relationship, d1>d4>d5. By maintaining the relationship of the dimension of the bearing lower end, a centrifugal force is applied to the lubricant 4 during rotation of the bearing. Thus, leakage of the oil from the lower cover 6 opened to the atmosphere can be prevented completely. In the gap G2 portion, which is the oil reservoir 14, the lubricant 4 flows into the bearing cavity forcibly by the pumping pressure at the hydrodynamic grooves 2A during rotation. Thus, there is no need to worry about leakage of the lubricant. However, when the amount of the lubricant injected during a bearing manufacturing process is abnormally large, the lubricant 4 may be stored in the gap between the lower cover 6 and the flange 2. In such a case, a centrifugal force is applied to the lubricant 4 to prevent leakage.

Figure 12:
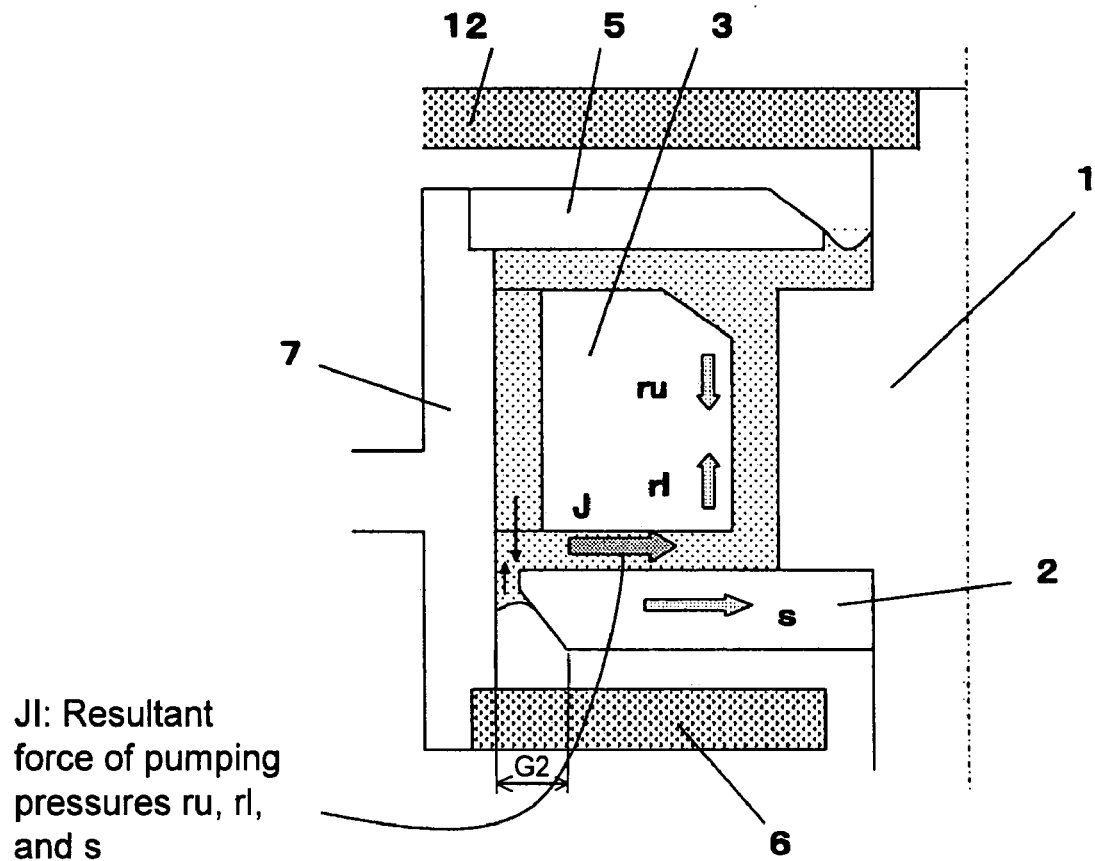
FIG. 12 is a diagram showing a lubricant circulation path according to the present invention.

The following is a description of how a direction of circulation of the lubricant 4 is selected. As shown in FIG. 2, a radial hydrodynamic bearing surface of the gap G1 is provided on an inner peripheral surface of the rotatable sleeve 3. A first circulation path for the lubricant which has a gap S3 is provided on the upper end surface side of the sleeve 3 in a direction which forms a substantially right angle with the bearing hole 3A. The communication hole 3E (second circulation path) which communicates with the first communication path is provided substantially parallel to the bearing surface of the sleeve 3. The thrust hydrodynamic bearing surface of the gap S1 is provided on the lower end surface of the sleeve 3. An upper opening portion having the maximum gap G3 is provided near an intersection of the bearing hole 3A and the first circulation path. The oil reservoir 14 having the maximum gap G2 is provided near an intersection of the thrust hydrodynamic bearing surface and the communication path (the second circulation path). Both the upper opening and the oil reservoir 14 are formed to be open to the atmosphere. As shown in FIGS. 2 and 12, the radial hydrodynamic grooves 3B have an asymmetrical herringbone pattern; the thrust hydrodynamic grooves 2A have an asymmetrical herringbone or spiral pattern. Thus, near the outer periphery of the flange, a resultant force of the pressures generated at the thrust hydrodynamic grooves and the radial hydrodynamic grooves is directed at least inward (a direction indicated by arrow J in FIG. 12) in the bearing during rotation. Accordingly, a force which forcibly carries the lubricant 4 from the oil reservoir 14 toward the inner periphery is applied. Thus, oil does not leak from the oil reservoir 14 (see FIG. 12). On the other hand, the lubricant 4 in the first circulation path receives a centrifugal force during rotation and is forcibly moved toward the second circulation path. In this way, oil leakage from the upper opening portion can be prevented. By appropriately designing the pumping pressures generated by the hydrodynamic grooves 3B and 2A, and the capillary pressures of the communication path 3E and the gap portions, the lubricant 4 circulates forcibly in the bearing and the air is smoothly discharged from the circulation path without being trapped therein. The air is separated by gas liquid separation due to a surface tension of the lubricant 4 itself and is appropriately discharged from the opening.

When a capillary pressure at the communication path 3E shown in FIG. 2 is defined as Pp, the capillary pressures at the radial gaps G1, G2, and G3 and the communication path (Pg1, Pg2, Pg3, and Pp) are set to satisfy the relationships:

Pg1>Pp,

Pp>Pg2, and

Pp>Pg3.

It is confirmed that, with such a structure, the lubricant 4 including the air which flows through the communication path can be discharged from a near opening portion most smoothly through observational experiment. By maintaining the appropriate difference in the capillary pressure at the gaps as described above, and setting differences in the magnitudes of the capillary pressures at the communication path and the gaps, air is smoothly discharged and the bearing gap is filled with the lubricant 4 in a preferable manner.

Figure 9:
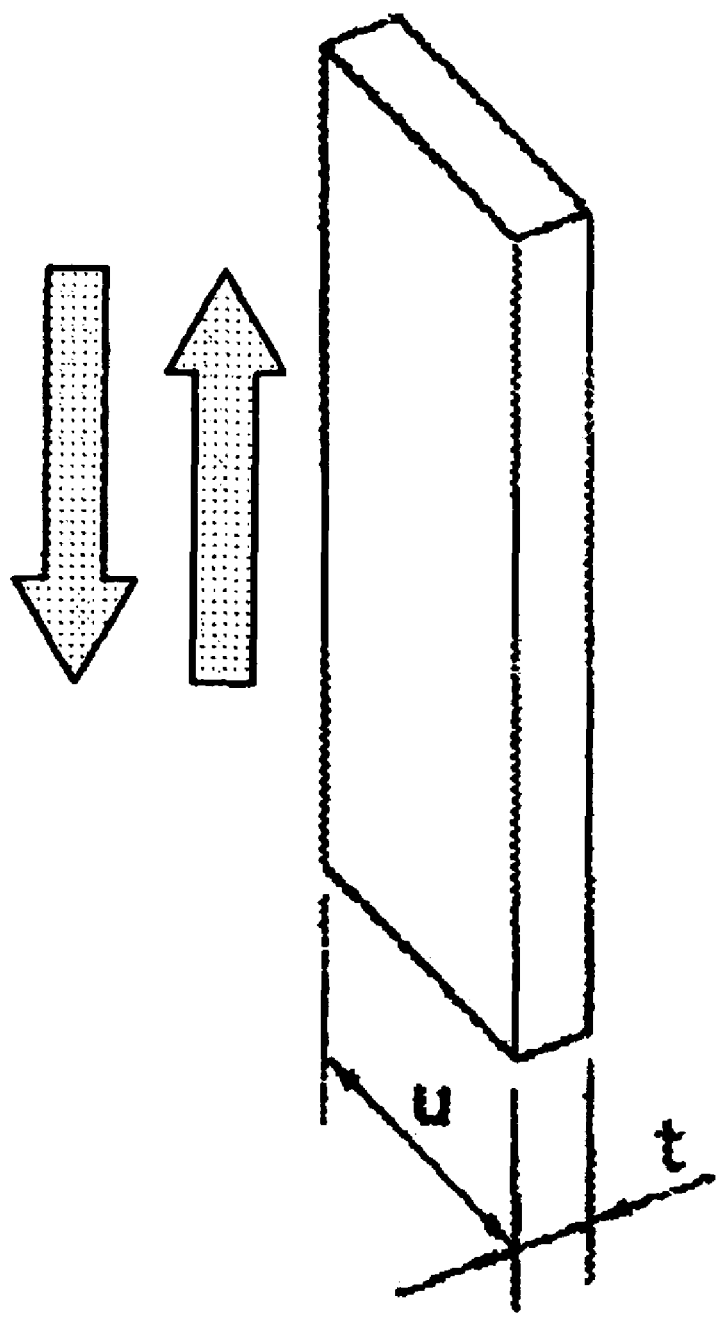
FIG. 9 is a diagram defining capillary pressures.
Figure 13:
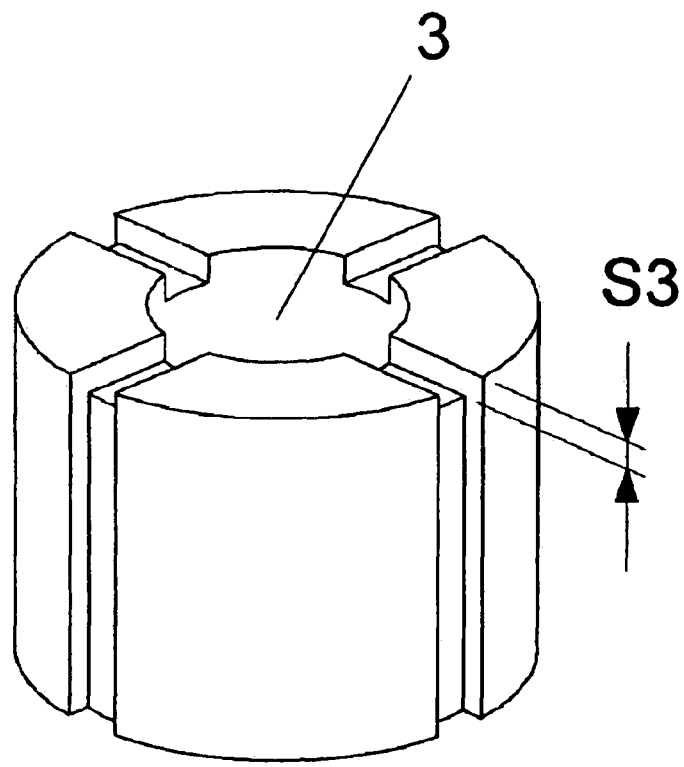
FIG. 13 is a diagram showing a shape of the circulation path in an embodiment of the present invention.

The circulation path of the gap S3 does not have to have a shape like a ring of a thin plate as shown in FIG. 2. The same effects can be obtained even when it has a shape of a groove, a hole, or a notch like the circulation hole 3E (see FIG. 13). In such a case, a cross-section has a substantially rectangular shape. The capillary pressure Pg [Pa] in the calculation model shown in FIG. 9 is represented by the following expression (13). The capillary pressure Pp at the communication path 3E can also be calculated by expression set 3.

(Expression set 3)

$$Fg = 2 \times (u+t) \times \gamma g \times \cos \theta g \quad (10)$$

$$Ag = u \times t \quad (11)$$

$$Pg = Fg/Ag \quad (12)$$

$$Pp = 2 \times \gamma g \times \cos \theta g \times (u+t)/(u \times t) \quad (13)$$

u: Length of a side of cross section [m]
t: Length of another side of cross section [m]
γg: Surface tension of oil [N/m]
θ: Contact angle of oil [rad]
Pg: Capillary pressure [Pa]

Specifically, when $\gamma=0.0288$ [N/m], $\theta=0.2269$ [radian], $u=0.0008$ [m], and $t=0.0001$ [m], Pp is a pressure of 560 [pascal].

Figure 16:
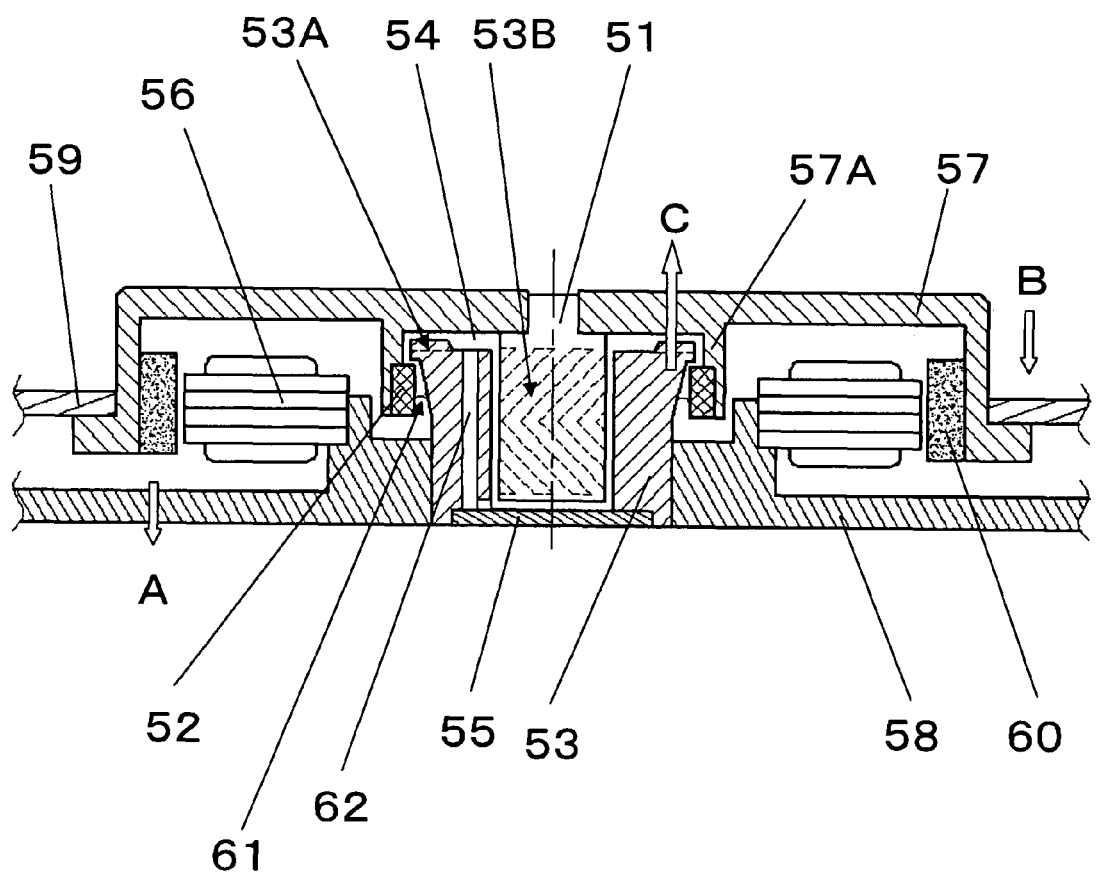
FIG. 16 is a diagram showing a structure of a hydrodynamic bearing type rotary device according to another embodiment of the present invention

In the above description, the hydrodynamic bearing rotary device is a so-called shaft fixed type, in which the shaft 1 is fixed to the base 8. However, the present invention is not limited to such a structure and can be applied to a hydrodynamic bearing rotary device of a shaft rotary type, in which the shaft rotates as shown in FIG. 16.

Figure 14:
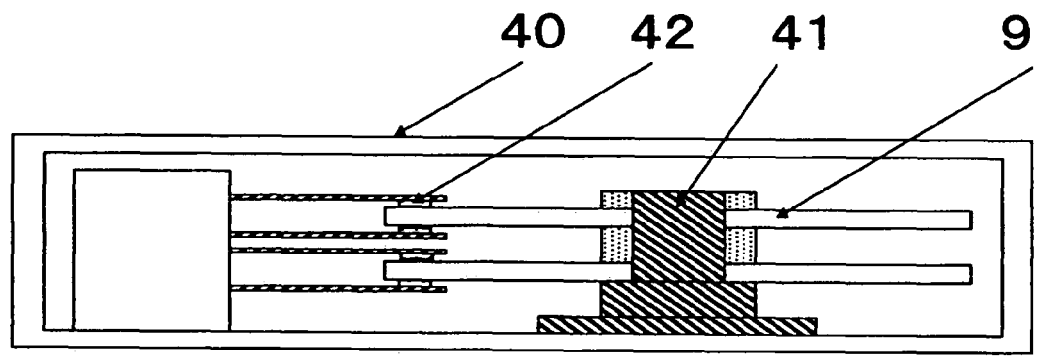
FIG. 14 is a diagram showing a recording and reproducing apparatus including the hydrodynamic bearing type rotary device of the present invention.

By applying the hydrodynamic bearing rotary device having the above structure to a recording and reproducing apparatus shown in FIG. 14, a recording and reproducing apparatus having a high reliability, which has small NRRO and the like and high performance and in which no lubricant leakage occurs, can be provided.

When the hydrodynamic bearing rotary device of the present invention is incorporated into the recording and reproducing apparatus shown in FIG. 14, ends of the shaft 1 are fixed to the base 8 and the lid 12. Thus, an amount of vibration due to sympathetic vibration during high-speed rotation is reduced by 50%. Thus, a state close to the non-vibration state is achieved, and the magnetic recording can be performed with high reliability. Since the lubricant 4 is kept in the bearing gap in a preferable manner, there is no generation of gas called oil mist. Thus, the reliability of recording and reproduction can be improved. Furthermore, even the air is caught during a manufacturing process for injecting the lubricant 4 into the gaps of the hydrodynamic bearing or the air is in the bearing cavity because the injecting operation is incomplete, the air can be completely discharged after rotation of about one minute and rotation with high performance can be obtained. This is an advantageous merit for a recording and reproducing apparatus.

As described above, in the hydrodynamic bearing rotary device used for a hard disc device and the like, a flange is provided integrally with a shaft near the lower portion. A sleeve is fitted to the shaft so as to be relatively rotatable. On at least one of an outer periphery of the shaft and an inner periphery of the sleeve, hydrodynamic grooves are provided. The flange forms a thrust bearing surface with a lower end surface of the sleeve. On at least one of the lower surface of the sleeve and an upper surface of the flange, hydrodynamic grooves are provided. The hydrodynamic grooves circulate a lubricant during rotation of the bearing. Capillary pressures at respective portions in the lubricant circulation path have different magnitudes. With such a structure, the principle that air tends to move toward the portion having a smaller capillary pressure is utilized to make it difficult for the air to be trapped inside the bearing, and to discharge the air smoothly. In this way, the oil rupture and deterioration of NRRO can be prevented, and the hydrodynamic bearing rotary device with high performance and reliability can be obtained.

Second Embodiment

Next, an example of a hydrodynamic bearing rotary device according to another embodiment of the present invention will be described as the second embodiment.

As shown in FIG. 16, the hydrodynamic bearing type rotary device according to the present embodiment has thrust bearings formed on a hub 57 and a sleeve 53, and includes a shaft 51, the hub 57, the sleeve 53, a lubricant 54 such as oil, high-fluidity grease, ionic liquids or the like, and a base 58. To the hub 57, a rotor magnet 60 is attached. To the base 58, a stator 56 around which a coil is wound is attached. A magnetic head or an optical head (not shown) accesses to a disc 59, which is attached to the hub 57 with clamp means (not shown), to record/read out information.

On at least one of an outer peripheral surface of the shaft 51 and an inner peripheral surface of the sleeve 53, radial hydrodynamic grooves 53B are formed. On at least one of a lower surface of the hub 57 and an upper surface of the sleeve 53, thrust hydrodynamic grooves 53A are formed. A clearance portion S2, which is a different dimension portion, is formed on an inner peripheral side of the thrust hydrodynamic grooves 53A.

A lower end of the sleeve 53 is blocked with a blockage plate 55. The hub 57 has a vertical portion 57A, and a stopper 52 is fixed thereto. Between the outer peripheral surface of the sleeve 53 and the stopper 52, a liquid gas interface 61 of the lubricant 54 is formed.

Figure 17:
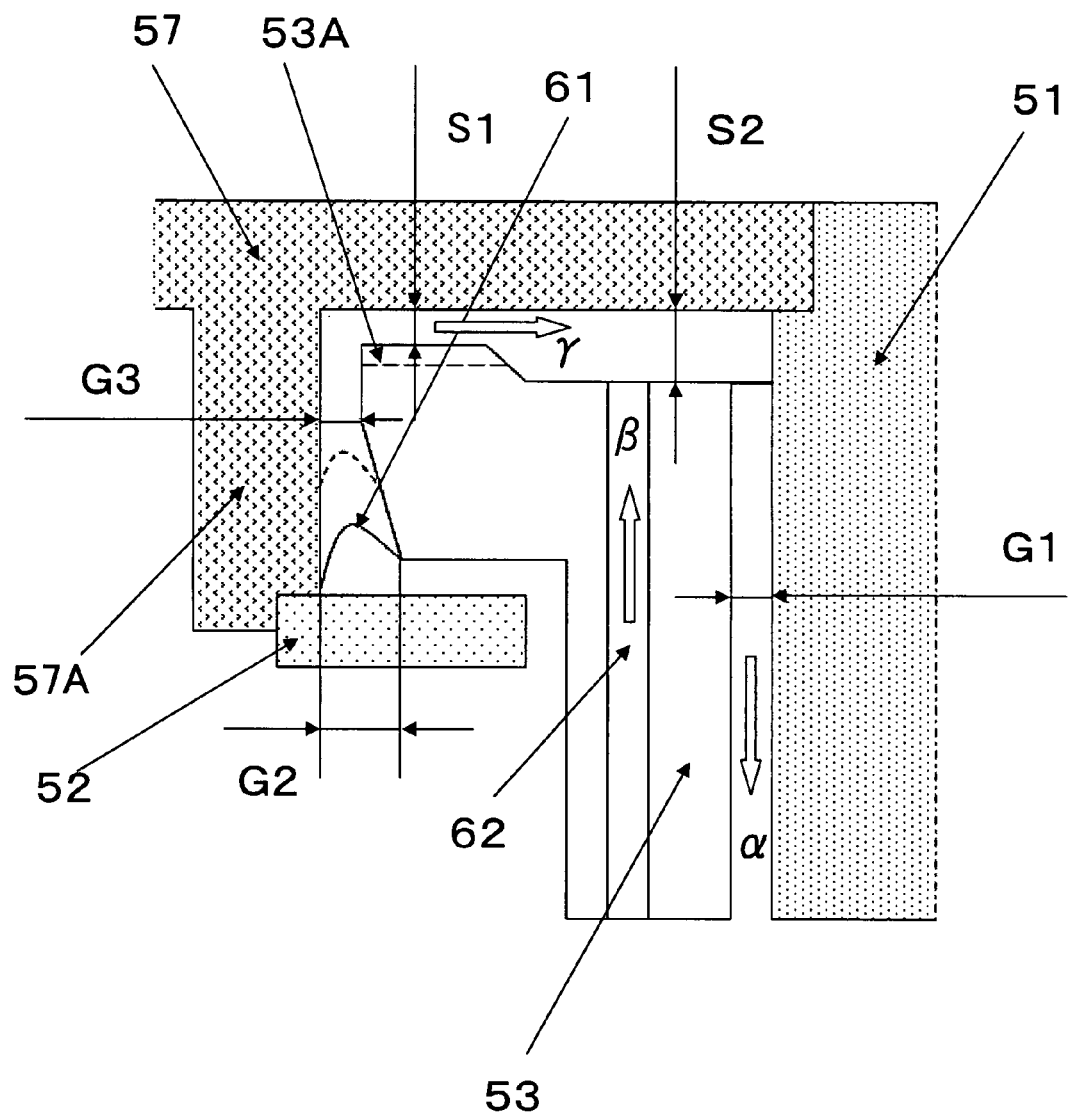
FIG. 17 is a enlarged cross sectional view showing a part of the hydrodynamic bearing type rotary device of FIG. 16.

The liquid gas interface may be formed between the vertical portion 57A of the hub 57 and the outer peripheral surface of the sleeve 53 as shown in FIG. 17. The shaft 51 may include a flange having an outer diameter larger than the shaft diameter on its lower portion.

The gap S2 between the hub 57 and the sleeve 53 communicates with the lower portion of the bearing gap between the shaft 51 and the sleeve 53 by a communication hole or path 62. At least the lubricant 54 such as oil, high-fluidity grease, ionic liquids or the like is filled or held in bearing gaps near the hydrodynamic grooves 53B and 53A, the communication hole 62 and the gap S2. To the base 58, the sleeve 53 is fixed. Since the base 58 is made of a magnetic material, the rotor magnet 60 generates an attraction force in an axial direction and presses the hub 57 toward the base 58. If the base 58 is made of a non-magnetic material, an attraction plate made of a magnetic material having a shape like a doughnut is fixed to, for example, a position opposing a lower end surface of the rotor magnet 60 to generate an attraction force).

As shown in FIG. 17, reference numerals 51, and S2 refer to gaps between two planar surfaces; reference numerals G1, G2, and G3 refer to radial gaps between two tubes.

Operations of the hydrodynamic bearing type rotary device of the present embodiment which has the above-described structure are as follow.

As shown in FIGS. 16 and 17, in the hydrodynamic bearing type rotary device of the present embodiment, when an electric current is supplied to a coil wound around the stator 56, a rotary magnetic field is generated and a rotary force is applied to the rotor magnet 60. This causes the hub 57 and the disc 59 to rotate.

As these members rotate, the hydrodynamic grooves 53B and 53A gather the lubricant 54 such as oil filled in the bearing gaps. Accordingly, pumping pressures are generated between the shaft 51 and the sleeve 53, and between the hub 57 and the sleeve 53.

As shown in FIGS. 16 and 17, the rotor magnet 60 and the base 58 generate a force attracting the rotor magnet 60 in the direction indicated by arrow A (FIG. 16). Further, the empty weight of the rotating part is applied in the direction indicated by arrow B (FIG. 16). On the other hand, the hydrodynamic pressure by the thrust hydrodynamic grooves 53A is applied in the direction indicated by arrow C (FIG. 16). In such an example, a floating level (oil film thickness) defined by a floating force of the thrust hydrodynamic grooves 53A is automatically defined such that the relationship:

$$A+B=C$$

is satisfied.

As shown in FIG. 16, the hydrodynamic grooves 53B form one or two asymmetrical herringbone pattern which is formed to generate a circulation force in the direction indicated by arrow α (FIG. 17), for example. The thrust hydrodynamic grooves 53A are designed to have a spiral pattern or asymmetrical pattern which carries the lubricant 4 from the outer peripheral side, where the radial gap G2 locates, toward the inner peripheral side as indicated by arrow γ (FIG. 17).

With such a structure, the lubricant 4 passes through the gap S1, which is a thrust bearing gap, and the clearance portion S2, which is a different dimension portion, and moves through the bearing hole, which is formed of the gap G1, from the upper side toward the lower side in the figure in the direction indicated by arrow α (FIG. 17). Then, the lubricant 54 flows back via the communication hole 62. In this way, the lubricant 54 is always supplied to the bearing gap of the hydrodynamic grooves 53B and 53A from the oil reservoir on the outer periphery of the sleeve 53.

In such a structure, parameters related to capillary forces at the gap G1 and G2 are also referred to as Pg1 and Pg2. By setting the parameters to satisfy the relationship:

$$Pg1>Pg2,$$

the lubricant tends to move toward inner peripheral side of the bearing. Thus, it becomes difficult for the lubricant to leak from the gap G2. The principle that air tends to move from a portion having a large capillary pressure toward a portion having a smaller capillary pressure is utilized to make it difficult for the air to be trapped inside the bearing and to smoothly discharge the bubbles from the gap G2.

Pg1 and Pg2 are calculated as follows when the gap shape (a shape of the lubricant reservoir) is a shape substantially like a tube.

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m]

When the parameters related to capillary forces at the gap G1, S2 and G2 are referred to as Pg1, Ps2, and Pg2, it becomes possible to make it difficult for bubble to be trapped inside the bearing by setting the parameters to satisfy the relationship, Pg1>Ps2>Pg2.

Pg1 and Pg2 are calculated as follows when the gap shape (a shape of the lubricant reservoir) is a shape substantially like a tube (expression set 1).

$$Fgo = \pi \times Do \times \gamma \times \cos\theta \quad (1)$$

$$Fgi = \pi \times Di \times \gamma \times \cos\theta \quad (2)$$

$$Di = Do - 2 \times rg \quad (3)$$

$$Fg = Fgo + Fgi \quad (4)$$

$$Ag = \pi \times (Do^2 - Di^2)/4 \quad (5)$$

$$Pg = Fg/Ag \quad (6)$$

γ: Surface tension of lubricant [N/m]
θ: Contact angle of oil [radian]
Do: Outer diameter of tube [m]
Di: Inner diameter of tube [m]
rg: Oil film thickness of tube [m]

Ps2 is calculated as follows when the gap shape (a shape of the lubricant reservoir) is a shape substantially like a thin disc plate (expression set 2).

$$Fs = 2\pi \times Ds \times \gamma \times \cos\theta \quad (7)$$

$$As = \pi \times Ds \times S1 \quad (8)$$

$$Ps = Fs/As \quad (9)$$

Ds: Inner diameter of lubricant reservoir having maximum gap S1 [m]
S: Maximum gap of lubricant reservoir between sleeve and hub [m]

INDUSTRIAL APPLICABILITY

In the present invention, the principle that air tends to move toward a portion having a small capillary pressure is utilized to make it difficult for air to become trapped inside the bearing, and to smoothly discharge the air. In this way, oil film rupture and deterioration of NRRO can be prevented and a hydrodynamic bearing type rotary device with high performance and reliability can be obtained. The present invention is widely applicable to recording and reproducing apparatuses for magnetic discs, optical discs, or the like, such as HDDs and the like.

The invention claimed is:

1. A hydrodynamic bearing type rotary device comprising:
a shaft having a radial hydrodynamic bearing surface provided on an outer peripheral surface thereof;
a flange provided integrally with the shaft at a lower portion of the shaft;
a sleeve having a bearing hole, the sleeve being fitted to the shaft so as to be relatively rotatable, wherein a radial gap G1 is interposed between the sleeve and the shaft, a gap S1 is interposed between the sleeve and the flange, and the flange forms a thrust bearing surface of the gap S1 with a lower end surface of the sleeve;
radial hydrodynamic grooves disposed on at least one of the outer periphery of the shaft and an inner periphery of the sleeve;
thrust hydrodynamic grooves disposed on at least one of the lower end surface of the sleeve and an upper surface of the flange;
a hub integrally fixed to an outer periphery of the sleeve, wherein a radial gap having a maximum gap G2 is provided between an outer peripheral surface of the flange and an inner surface of the hub which opposes the flange, and wherein a communication path which communicates with the flange is provided on the sleeve or the hub;
a lubricant held at least in the gaps S1 and G1, and the communication path, wherein at least the gap G1, the gap S1, and the communication path form a circulation path in which the lubricant circulates,
wherein the gap G1 has a parameter Pg1 and the gap G2 has a parameter Pg2, and each of the gaps G1 and G2 forms a lubricant reservoir having a tube shape, and
wherein Pg1>Pg2, and the parameters Pg1 and Pg2 are calculated as follows:

$$Fgo = \pi \times Do \times \gamma \times \cos\theta$$

$$Fgi = \pi \times Di \times \gamma \times \cos\theta$$

$$Di = Do - 2 \times rg$$

$$Fg = Fgo + Fgi$$

$$Ag = \pi \times (Do^2 - Di^2)/4$$

$$Pg = Fg/Ag$$

γ: Surface tension of lubricant [N/m]
θ: Contact angle of oil [radian]
Do: Outer diameter of tube [m]
Di: Inner diameter of tube [m]
rg: Oil film thickness of tube [m].

2. The hydrodynamic bearing type rotary device according to claim 1, wherein:
an inner peripheral surface of an upper cover opposes the outer peripheral surface of an upper portion of the shaft; and
an inner diameter of the upper cover has a length shorter than an outer diameter of the radial hydrodynamic bearing surface of the shaft.

3. The hydrodynamic bearing type rotary device according to claim 1, wherein:
a lower cover is fixed to the hub with a gap between the lower cover and a lower surface of the flange and
an inner diameter of the lower cover is smaller than an outer diameter of the radial hydrodynamic bearing surface of the shaft.

4. The hydrodynamic bearing type rotary device according to claim 1, wherein:
a first circulation path for the lubricant is provided on one end surface side of the sleeve so as to form a substantially right angle with the bearing hole;
the communication path communicates with the first circulation path and is provided substantially parallel to the bearing surface of the sleeve;
a thrust hydrodynamic bearing surface is provided on an upper end surface of the sleeve;
an opening portion having a maximum gap G3 is provided near an intersection of the bearing hole and the first circulation path, the gap G3 forms a lubricant reservoir;
the lubricant reservoirs formed by the gap G2 and the gap G3 are formed to be open to an atmosphere;
a resultant force of a pressure generated by the thrust hydrodynamic grooves and a pressure generated by the radial hydrodynamic grooves during rotation is in a direction to move the lubricant from the oil reservoir having the gap G2 toward the inner periphery of the sleeve; and
the oil in the first circulation path is moved to the communication path by a centrifugal force.

5. A recording and reproducing apparatus comprising the hydrodynamic bearing type rotary device according to claim 1.

6. A hydrodynamic bearing type rotary device comprising:
a shaft having a radial hydrodynamic bearing surface provided on an outer peripheral surface thereof;
a flange provided integrally with the shaft at a lower portion of the shaft;
a sleeve having a bearing hole, the sleeve being fitted to the shaft so as to be relatively rotatable, wherein a radial gap G1 is interposed between the sleeve and the shaft, a gap S1 is interposed between the sleeve and the flange, and the flange forms a thrust bearing surface of the gap S1 with a lower end surface of the sleeve;
radial hydrodynamic grooves disposed on at least one of the outer periphery of the shaft and an inner periphery of the sleeve;
thrust hydrodynamic grooves disposed on at least one of the lower end surface of the sleeve and an upper surface of the flange;
a different dimension portion having a maximum gap S2 provided between the flange and the lower end surface of the sleeve in a portion other than the thrust bearing surface;
a hub integrally fixed to an outer periphery of the sleeve, wherein a radial gap having a maximum gap G2 is provided between an outer peripheral surface of the flange and an inner surface of the hub which opposes the flange;
an upper cover provided above the sleeve with a minimum gap S3 and a maximum gap S4 being provided between the upper cover and an upper end surface of the sleeve, the upper cover being fixed to the hub and an inner diameter portion of the upper cover having a gap G3 at a position opposing the outer peripheral surface of an upper portion of the shaft;
a communication path provided on the sleeve or the hub, the communication path communicating the flange with the upper cover; and
a lubricant held at least in the gaps S1, S2, G1 and S3, and the communication path,
wherein the gap G1 has a parameter Pg1, the gap S2 has a parameter Ps2, and the gap G2 has a parameter Pg2,
wherein each of the gaps G1 and G2 forms a lubricant reservoir having a tube shape, and the gap S2 forms a lubricant reservoir having a disc shape;
wherein Pg1>Ps2>Pg2, and the parameters Pg1 and Pg2 are calculated as follows:

$$Fgo = \pi \times Do \times \gamma \times \cos\theta$$

$$Fgi = \pi \times Di \times \gamma \times \cos\theta$$

$$Di = Do - 2 \times rg$$

$$Fg = Fgo + Fgi$$

$$Ag = \pi \times (Do^2 - Di^2)/4$$

$$Pg = Fg/Ag$$

$\gamma$: Surface tension of lubricant [N/m]
$\theta$: Contact angle of oil [radian]
Do: Outer diameter of tube [m]
Di: Inner diameter of tube [m]
rg: Oil film thickness of tube [m], and wherein the parameter Ps2 is calculated as follows:

$$Fs = 2\pi \times Ds \times \gamma \times \cos\theta$$

$$As = \pi \times Ds \times S1$$

$$Ps = Fs/As$$

Ds: Inner diameter of lubricant reservoir having maximum gap Si [m]
S: Maximum gap of lubricant reservoir between sleeve and hub [m].

7. The hydrodynamic bearing type rotary device according to claim 6, wherein:
an inner diameter of the upper cover has a length shorter than an outer diameter of the radial hydrodynamic bearing surface of the shaft.

8. The hydrodynamic bearing type rotary device according to claim 6, wherein:
a lower cover is fixed to the sleeve or the hub with a gap between the lower cover and a lower surface of the flange and
an inner diameter of the lower cover is smaller than an outer diameter of the radial hydrodynamic bearing surface of the shaft.

9. The hydrodynamic bearing type rotary device according to claim 6, wherein:
a first circulation path for the lubricant is provided on one end surface side of the sleeve so as to form a substantially right angle with the bearing hole;
the communication path communicates with the first circulation path and is provided substantially parallel to the bearing surface of the sleeve;
a thrust hydrodynamic bearing surface is provided on the upper end surface of the sleeve;
an opening portion having the gap G3 is provided near an intersection of the bearing hole and the first circulation path, the gap G3 forms a lubricant reservoir;
the lubricant reservoirs formed by the gap G2 and the gap G3 are formed to be open to an atmosphere;
a resultant force of a pressure generated by the thrust hydrodynamic grooves and a pressure generated by the radial hydrodynamic grooves during rotation is in a direction to move the lubricant from the oil reservoir having the gap G2 toward the inner periphery of the sleeve; and
the oil in the first circulation path is moved to the communication path by a centrifugal force.

10. A recording and reproducing apparatus comprising the hydrodynamic bearing type rotary device according to claim 6.

11. A hydrodynamic bearing type rotary device comprising:
a shaft having a radial hydrodynamic bearing surface provided on an outer peripheral surface thereof;
a flange provided integrally with the shaft at a lower portion of the shaft;
a sleeve having a bearing hole, the sleeve being fitted to the shaft so as to be relatively rotatable, wherein a radial gap G1 is interposed between the sleeve and the shaft;
radial hydrodynamic grooves disposed on at least one of the outer periphery of the shaft and an inner periphery of the sleeve;
thrust hydrodynamic grooves disposed on at least one of the lower end surface of the sleeve and an upper surface of the flange;

a hub integrally fixed to an outer periphery of the sleeve, wherein a gap G2 is provided between an outer peripheral surface of the flange and an inner surface of the hub which opposes the flange;

an upper cover provided above the sleeve with a minimum gap S3 being provided between the upper cover and an upper end surface of the sleeve, the upper cover being fixed to the hub and an inner diameter portion of the cover being provided at a position opposing the outer peripheral surface of an upper portion of the shaft so as to form a maximum radial gap G3;

a different dimension portion having a gap S4 larger than the gap S3, the different dimension portion being provided near an inner periphery of the gap S3;

a communication path provided on the sleeve or the hub, the communication path communicating the flange with the upper cover; and a lubricant held at least in the gaps S1, G1 and S3, and the communication path, wherein the gap G1 has a parameter Pg1, the gap S3 has a parameter Ps3, and the gap S4 has a parameter Ps4, wherein the gap G1 forms a lubricant reservoir having a tube shape, and each of the gaps S3 and S4 forms a lubricant reservoir having a disc shape, wherein Pg1>Ps3>Ps4, and the parameter Pg1 is calculated as follows:

$$Fgo = \pi \times Do \times \gamma \times \cos\theta$$

$$Fgi = \pi \times Di \times \gamma \times \cos\theta$$

$$Di = Do - 2 \times rg$$

$$Fg = Fgo + Fgi$$

$$Ag = \pi \times (Do^2 - Di^2)/4$$

$$Pg = Fg/Ag$$

γ: Surface tension of lubricant [N/m]
θ: Contact angle of oil [radian]
Do: Outer diameter of tube [m]
Di: Inner diameter of tube [m]
rg: Oil film thickness of tube [m], and wherein the parameters Ps3 and Ps4 are calculated as follows:

$$Fs = 2\pi \times Ds \times \gamma \times \cos\theta$$

$$As = \pi \times Ds \times S1$$

$$Ps = Fs/As$$

Ds: Inner diameter of lubricant reservoir having maximum gap Si [m]
S: Maximum gap of lubricant reservoir between sleeve and hub [m].

12. The hydrodynamic bearing type rotary device according to claim 11, wherein:
an inner diameter of the upper cover has a length shorter than an outer diameter of the radial hydrodynamic bearing surface of the shaft.

13. The hydrodynamic bearing type rotary device according to claim 11, wherein:
a lower cover is fixed to the sleeve or the hub with a gap between the lower cover and a lower surface of the flange and
an inner diameter of the lower cover is smaller than an outer diameter of the radial hydrodynamic bearing surface of the shaft.

14. The hydrodynamic bearing type rotary device according to claim 11, wherein:
a first circulation path for the lubricant is provided on one end surface side of the sleeve so as to form a substantially right angle with the bearing hole;
the communication path communicates with the first circulation path and is provided substantially parallel to the bearing surface of the sleeve;
a thrust hydrodynamic bearing surface is provided on the upper end surface of the sleeve;
an opening portion having the maximum radial gap G3 is provided near an intersection of the bearing hole and the first circulation hole;
an oil reservoir having the gap G2 is provided near an intersection of the lower end surface of the sleeve and the communication path;
the opening portion having the maximum radial gap G3 and the oil reservoir having the gap G2 are formed to be open to an atmosphere;
a resultant force of a pressure generated by the thrust hydrodynamic grooves and a pressure generated by the radial hydrodynamic grooves during rotation is in a direction to move the lubricant from the oil reservoir having the gap G2 toward the inner periphery of the sleeve; and
the oil in the first circulation path is moved to the communication path by a centrifugal force.

15. A recording and reproducing apparatus comprising the hydrodynamic bearing type rotary device according to claim 11.

16. A hydrodynamic bearing type rotary device comprising:
a shaft having a radial hydrodynamic bearing surface provided on an outer peripheral surface thereof;
a flange provided integrally with the shaft at a lower portion of the shaft;
a sleeve having a bearing hole, the sleeve being fitted to the shaft so as to be relatively rotatable, wherein a radial gap G1 is interposed between the sleeve and the shaft, a gap S1 is interposed between the sleeve and the flange, and the flange forms a thrust bearing surface of the gap S1 with a lower end surface of the sleeve;
radial hydrodynamic grooves disposed on at least one of the outer periphery of the shaft and an inner periphery of the sleeve;
thrust hydrodynamic grooves disposed on at least one of the lower end surface of the sleeve and an upper surface of the flange;
a hub integrally fixed to an outer periphery of the sleeve, wherein a gap G2 is provided between an outer peripheral surface of the flange and an inner surface of the hub which opposes the flange;
an upper cover provided above the sleeve with a minimum gap S3 being provided between the upper cover and an upper end surface of the sleeve, the upper cover being fixed to the hub and an inner diameter portion of the upper cover being provided at a position opposing the outer peripheral surface of an upper portion of the shaft so as to form a maximum radial gap G3;
a communication path provided on the sleeve or the hub, the communication path communicating the flange with the upper cover; and
a lubricant held at least in the gaps S1, S3, G1 and G3, and the communication path,
wherein the gap G1 has a parameter Pg1, the gap S3 has a parameter Ps3, and the gap G3 has a parameter Pg3, wherein each of the gaps G1 and G3 forms a lubricant reservoir having a tube shape, and the gap S3 forms a lubricant reservoir having a disc shape, wherein Pg1>Ps3>Pg3, and the parameters Pg1 and Pg3 are calculated as follows:

$$Fgo = \pi \times Do \times \gamma \times \cos\theta$$

$$Fgi = \pi \times Di \times \gamma \times \cos\theta$$

$$Di = Do - 2 \times rg$$

$$Fg = Fgo + Fgi$$

$$Ag = \pi \times (Do^2 - Di^2)/4$$

$$Pg = Fg/Ag$$

γ: Surface tension of lubricant [N/m]
θ: Contact angle of oil [radian]
Do: Outer diameter of tube [m]
Di: Inner diameter of tube [m]
rg: Oil film thickness of tube [m], and wherein Ps3 is calculated as follows:

$$Fs = 2\pi Ds \times \gamma \times \cos\theta$$

$$As = \pi \times Ds \times S1$$

$$Ps = Fs/As$$

Ds: Inner diameter of lubricant reservoir having maximum gap Si [m]
S: Maximum gap of lubricant reservoir between sleeve and hub [m].

17. The hydrodynamic bearing type rotary device according to claim 16, wherein:
an inner diameter of the upper cover has a length shorter than an outer diameter of the radial hydrodynamic bearing surface of the shaft.

18. The hydrodynamic bearing type rotary device according to claim 16, wherein:
a lower cover is fixed to the sleeve or the hub with a gap between the lower cover and a lower surface of the flange and
an inner diameter of the lower cover is smaller than an outer diameter of the radial hydrodynamic bearing surface of the shaft.

19. The hydrodynamic bearing type rotary device according to claim 16, wherein:
a first circulation path for the lubricant is provided on one end surface side of the sleeve so as to form a substantially right angle with the bearing hole;
the communication path communicates with the first circulation path and is provided substantially parallel to the bearing surface of the sleeve;
a thrust hydrodynamic bearing surface is provided on the upper end surface of the sleeve;
an opening portion including the maximum radial gap G3 is provided near an intersection of the bearing hole and the first circulation hole;
an oil reservoir having the gap G2 is provided near an intersection of the lower end surface of the sleeve and the communication path;
the opening portion having the maximum radial gap G3 and the oil reservoir having the gap G2 are formed to be open to an atmosphere;
a resultant force of a pressure generated by the thrust hydrodynamic grooves and a pressure generated by the radial hydrodynamic grooves during rotation is in a direction to move the lubricant from the oil reservoir having the gap G2 toward the inner periphery of the sleeve; and
the oil in the first circulation path is moved to the communication path by a centrifugal force.

20. A recording and reproducing apparatus comprising the hydrodynamic bearing type rotary device according to claim 16.

21. A hydrodynamic bearing type rotary device comprising:
a shaft having a radial hydrodynamic bearing surface provided on an outer peripheral surface thereof;
a flange provided integrally with the shaft at a lower portion of the shaft;
a sleeve having a bearing hole, the sleeve being fitted to the shaft so as to be relatively rotatable, wherein a radial gap G1 is interposed between the sleeve and the shaft, a gap S1 is interposed between the sleeve and the flange, and the flange forms a thrust bearing surface of the gap S1 with a lower end surface of the sleeve;
radial hydrodynamic grooves disposed on at least one of the outer periphery of the shaft and an inner periphery of the sleeve;
thrust hydrodynamic grooves disposed on at least one of the lower surface of the sleeve and an upper surface of the flange;
a hub integrally fixed to an outer periphery of the sleeve, wherein a radial gap having a maximum gap G2 is provided between an outer peripheral surface of the flange and an inner surface of the hub which opposes the flange;
an upper cover provided above the sleeve with a minimum gap S3 being provided between the upper cover and an upper end surface of the sleeve, the upper cover being fixed to the hub and an inner diameter portion of the upper cover being provided at a position opposing the outer peripheral surface of an upper portion of the shaft so as to form a maximum radial gap G3;
a communication path provided on the sleeve or the hub, the communication path communicating the flange with the upper cover;
a lubricant held at least in the gaps S1 and G1, and the communication path,
wherein at least the gap G1, the gap S1, and the communication path form a circulation path in which the lubricant circulates,
wherein the gap G1 has a parameter Pg1, the gap G2 has a parameter Pg2, and the gap G3 has a parameter Pg3, and the communication path has a parameter Pp,
wherein each of the gaps G1, G2, and G3, and the communication path forms a lubricant reservoir having a tube shape,
wherein Pg1>Pp, Pp>Pg2, and Pp>Pg3, and the parameters Pg1, Pg2, and Pg3 are calculated as follows:

$$Fgo = \pi \times Do \times \gamma \times \cos\theta$$

$$Fgi = \pi \times Di \times \gamma \times \cos\theta$$

$$Di = Do - 2 \times rg$$

$$Fg = Fgo + Fgi$$

$$Ag = \pi \times (Do^2 - Di^2)/4$$

$$Pg = Fg/Ag$$

γ: Surface tension of lubricant [N/m]
θ: Contact angle of oil [radian]
Do: Outer diameter of tube [m]

Di: Inner diameter of tube [m]
rg: Oil film thickness of tube [m], and
wherein Pp is calculated as follows:

$$Fg=2\times(u+t)\times\gamma g\times\cos\theta g$$

$$Ag=u\times t$$

$$Pg=Fg/Ag$$

$$Pp=2\times\gamma g\times\cos\theta g\times(u+t)/(u\times t)$$

u: Length of a side of cross section [m]
t: Length of another side of cross section [m]
γg: Surface tension of oil [N/m]
θ: Contact angle of oil [rad].

22. The hydrodynamic bearing type rotary device according to claim 21, wherein:
an inner diameter of the upper cover has a length shorter than an outer diameter of the radial hydrodynamic bearing surface of the shaft.

23. The hydrodynamic bearing type rotary device according to claim 21, wherein:
a lower cover is fixed to the sleeve or the hub with a gap between the lower cover and a lower surface of the flange and
an inner diameter of the lower cover is smaller than an outer diameter of the radial hydrodynamic bearing surface of the shaft.

24. The hydrodynamic bearing type rotary device according to claim 21, wherein:
a first circulation path for the lubricant is provided on one end surface side of the sleeve so as to form a substantially right angle with the bearing hole;
the communication path communicates with the first circulation path and is provided substantially parallel to the bearing surface of the sleeve;
a thrust hydrodynamic bearing surface is provided on the upper end surface of the sleeve;
an opening portion including the maximum radial gap G3 is provided near an intersection of the bearing hole and the first circulation hole;
an oil reservoir having the maximum gap G2 is provided near an intersection of the lower end surface of the sleeve and the communication path;
the opening portion having the maximum radial gap G3 and the oil reservoir having the gap G2 are formed to be open to an atmosphere;
a resultant force of a pressure generated by the thrust hydrodynamic grooves and a pressure generated by the radial hydrodynamic grooves during rotation is in a direction to move the lubricant from the oil reservoir having the gap G2 toward the inner periphery of the sleeve; and
the oil in the first circulation path is moved to the communication path by a centrifugal force.

25. A recording and reproducing apparatus comprising the hydrodynamic bearing type rotary device according to claim 21.

26. A hydrodynamic bearing type rotary device comprising:
a shaft having a radial hydrodynamic bearing surface provided on an outer peripheral surface thereof;
a hub provided integrally with one end portion of the shaft;
a sleeve having a bearing hole, the sleeve being fitted to the shaft so as to be relatively rotatable, wherein a radial gap G1 is interposed between the sleeve and the shaft, a gap S1 is interposed between the sleeve and the hub, a radial gap having a maximum gap G2 is provided between an outer peripheral surface of the sleeve and an inner surface of the hub which opposes the sleeve, and the hub forms a thrust bearing surface of the gap S1 with one end surface of the sleeve;
radial hydrodynamic grooves disposed on at least one of the outer periphery of the shaft and an inner periphery of the sleeve;
thrust hydrodynamic grooves disposed on at least one of the end surface of the sleeve and an opposing surface of the hub;
a communication path provided in the sleeve, the communication path communicating with the hub;
a lubricant held at least in the gaps S1 and G1, and the communication path,
wherein at least the gap G1, the gap S1, and the communication path form a circulation path in which the lubricant circulates,
wherein the gap G1 has a parameter Pg1 and the gap G2 has a parameter Pg2,
wherein each of the gaps G1 and G2 forms a lubricant reservoir having a tube shape,
wherein Pg1>Pg2, and the parameters Pg1 and Pg2 are calculated as follows:

$$Fgo=\pi\times Do\times\gamma\times\cos\theta$$

$$Fgi=\pi\times Di\times\gamma\times\cos\theta$$

$$Di=Do-2\times rg$$

$$Fg=Fgo+Fgi$$

$$Ag=\pi\times(Do^2-Di^2)/4$$

$$Pg=Fg/Ag$$

γ: Surface tension of lubricant [N/m]
θ: Contact angle of oil [radian]
Do: Outer diameter of tube [m]
Di: Inner diameter of tube [m]
rg: Oil film thickness of tube [m].

27. A recording and reproducing apparatus comprising the hydrodynamic bearing type rotary device according to claim 26.

28. A hydrodynamic bearing type rotary device comprising:
a shaft having a radial hydrodynamic bearing surface provided on an outer peripheral surface thereof;
a hub provided integrally with one end of the shaft;
a sleeve having a bearing hole, the sleeve being fitted to the shaft so as to be relatively rotatable, wherein a radial gap G1 is interposed between the sleeve and the shaft, a gap S1 is interposed between the sleeve and the hub, a radial gap having a maximum gap G2 is provided between an outer peripheral surface of the sleeve and an inner surface of the hub which opposes the sleeve, and the hub forms a thrust bearing surface of the gap S1 with one end surface of the sleeve;
radial hydrodynamic grooves are provided on at least one of the outer periphery of the shaft and an inner periphery of the sleeve;
thrust hydrodynamic grooves are provided on at least one of the end surface of the sleeve and an opposing surface of the hub;
a different dimension portion having a maximum gap S2 provided between the hub and the end surface of the sleeve in a portion other than the thrust bearing surface;

a communication path provided in the sleeve, the communication path communicating with the hub; and a lubricant held at least in the gaps S1, G1, S2 and G2, and the communication path, wherein the gap G1 has a parameter Pg1, the gap S2 has parameter Ps2, and the gap G2 has a parameter Pg2, wherein each of the gaps G1 and G2 forms a lubricant reservoir having a tube shape, and the gap S2 forms a lubricant reservoir having a disc shape, wherein Pg1>Ps2>Pg2, and the parameters Pg1 and Pg2 are calculated as follows:

$$Fgo = \pi \times Do \times \gamma \times \cos\theta$$

$$Fgi = \pi \times Di \times \gamma \times \cos\theta$$

$$Di = Do - 2 \times rg$$

$$Fg = Fgo + Fgi$$

$$Ag = \pi \times (Do^2 - Di^2)/4$$

$$Pg = Fg/Ag$$

$\gamma$: Surface tension of lubricant [N/m]
$\theta$: Contact angle of oil [radian]
Do: Outer diameter of tube [m]
Di: Inner diameter of tube [m]
rg: Oil film thickness of tube [m], and wherein the parameter Ps2 is calculated as follows:

$$Fs = 2\pi \times Ds \times \gamma \times \cos\theta$$

$$As = \pi \times Ds \times S1$$

$$Ps = Fs/As$$

Ds: Inner diameter of lubricant reservoir having maximum gap Si [m]
S: Maximum gap of lubricant reservoir between sleeve and hub [m].

29. A recording and reproducing apparatus comprising the hydrodynamic bearing type rotary device according to claim 28.

* * * * *